(12) United States Patent
Takeda et al.

(10) Patent No.: US 11,284,378 B2
(45) Date of Patent: Mar. 22, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Yuki Matsumura, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/473,709

(22) PCT Filed: Dec. 26, 2017

(86) PCT No.: PCT/JP2017/046562
§ 371 (c)(1),
(2) Date: Jun. 26, 2019

(87) PCT Pub. No.: WO2018/124031
PCT Pub. Date: Jul. 5, 2018

(65) Prior Publication Data
US 2019/0349920 A1    Nov. 14, 2019

(30) Foreign Application Priority Data
Dec. 27, 2016    (JP) .............................. JP2016-254383

(51) Int. Cl.
*H04W 72/04*    (2009.01)
*H04L 5/00*    (2006.01)
*H04L 5/10*    (2006.01)

(52) U.S. Cl.
CPC ....... *H04W 72/0413* (2013.01); *H04L 5/0051* (2013.01); *H04L 5/0094* (2013.01); *H04L 5/10* (2013.01)

(58) Field of Classification Search
CPC ............ H04W 72/042; H04W 72/0446; H04L 1/1887
See application file for complete search history.

(56) References Cited

U.S. PATENT DOCUMENTS 9,609,647 B2 *   3/2017  You ...................... H04W 72/04
10,523,395 B2 * 12/2019  Kim ..................... H04W 72/04
10,736,093 B2 *  8/2020  Akkarakaran ........ H04L 5/1469
(Continued)

OTHER PUBLICATIONS

International Search Report issued in PCT/JP2017/046562 dated Mar. 27, 2018 (5 Pages).
(Continued)

*Primary Examiner* — Rhonda L Murphy
(74) *Attorney, Agent, or Firm* — Osha Bergman Watanabe & Burton LLP

(57) ABSTRACT

The present invention is designed to support various UL control channels while reducing the burden of implementation. According to the present invention, a user terminal has a transmission section that transmits uplink control information (UCI) using an uplink (UL) control channel having a first duration, and a control section that controls the transmission of the UCI. The UL control channel of the first duration is constituted by a plurality of units, and each of the plurality of units is constituted by a UL control channel having a second duration that is shorter than the first duration.

7 Claims, 22 Drawing Sheets

(56) References Cited

U.S. PATENT DOCUMENTS

2020/0367173 A1* 11/2020 Ryu ...................... H04W 52/14

OTHER PUBLICATIONS

Written Opinion of the International Searching Authority issued in PCT/JP2017/046562 dated Mar. 27, 2018 (4 Pages).
CMCC; "Further discussion on uplink control channel design for NR"; 3GPP TSG RAN WG1 Meeting #87, R1 -1612191; Reno, USA, Oct. 14-18, 2016 (5 Pages).
Intel Corporation; "UL control channel design with long duration"; 3GPP TSG-RAN WG1 #87, R1-1611995; Reno, USA, Nov. 14-18, 2016 (5 Pages).
LG Electronics; "Design of long duration UL control channel for NR"; 3GPP TSG RAN WG1 Meeting #87, R1-1611844 Reno, USA, Nov. 14-18, 2016 (4 Pages).
Ericsson; "On DM-RS and short UCI"; TSG-RAN WG1 #87, R1-1612917; Reno, NV, USA, Nov. 14-18, 2016 (2 Pages).

* cited by examiner

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1), in addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," and so on).

In existing LTE systems (for example, LTE Rel. 8 to 13), downlink (DL) and/or uplink (UL) communication are performed using one-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ: Hybrid Automatic Repeat reQuest) and so on.

Also, in existing LTE systems (for example, LTE Rel. 8 to 13), a user terminal transmits uplink control information (UCI) by using a UL control channel (for example, PUCCH: Physical Uplink Control Channel) a UL data channel (for example, PUSCH: Physical Uplink Shared Channel). The format of this UL control channel is referred to as "PUCCH format" and so on.

UCI includes at least one of a scheduling request (SR), retransmission control information (HARQ-ACK (Hybrid Automatic Repeat reQuest-Acknowledgement), ACK and/or NACK (Negative ACK)) in response to DL data (DL data channel (for example, PDSCH: Physical Downlink Shared Channel)), and channel state information (CSI).

CITATION LIST

Non-Patent Literature

Non-Patent Literature 1; 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010.

SUMMARY OF INVENTION

Technical Problem

It is assumed that future radio communication systems (for example, LTE Rd. 14, LTE Rel. 15 (or later versions), 5G, NR, etc.) will transmit UCI using a UL control channel of a different format than existing LTE systems (for example, LTE Rel. 13 and/or earlier versions).

For example, the PUCCH formats for use in existing LTE systems are comprised of one-ms subframe units, Meanwhile, for future radio communication systems, a study is in progress to support a UL control channel having a shorter duration than existing LTE systems (hereinafter also referred to as a "short PUCCH"). Furthermore, a study is in progress to support a UL control channel having a longer duration than this short PUCCH (hereinafter also referred to as a "long PUCCH").

In this way, it is possible that future radio communication systems will support various UL control channels (including, for example, a short PUCCH and/or a long PUCCH), and there is a possibility that the burden of implementing UL control channels in user terminals and/or radio base stations will increase.

The present invention has been made in view of the above, and it is therefore an object of the present invention to provide a user terminal and a radio communication method, whereby UL control channels of various formats can be supported while reducing the burden of implementation.

Solution to Problem

According to one aspect of the present invention, a user terminal has a transmission section that transmits uplink control information (UCI) using an uplink (UL) control channel having a first duration, and a control section that controls the transmission of the UCI, and, in this user terminal, the UL control channel of the first duration is constituted by a plurality of units, and each of the plurality of units is constituted by a UL control channel having a second duration that is shorter than the first duration.

Advantageous Effects of Invention

According to the present invention, it is possible to support UL control channels of various formats while reducing the burden of implementation.

DESCRIPTION OF EMBODIMENTS

Future radio communication systems (for example, LTE Rel. 14, 15 and/or later versions, 5G, NR, etc.) are under study for introducing multiple numerologies (including, for example, subcarrier spacing and/or symbol duration), not a single numerology. For example, future radio communication systems may support multiple subcarrier spacings such as 15 kHz, 30 kHz, 60 kHz, 120 kHz and 240 kHz.

Also, future radio communication systems are being studied to introduce time units (also referred to as "subframes," "slots," "minislots," "subslots," "transmission time intervals (TTIs)," "short TTIs," "radio frames" and so on) that are the same as and/or different than existing LTE systems (LTE Rel. 13 or earlier versions), while supporting multiple numerologies and so on.

Subframes may serve as a time unit having a predetermined time duration (for example, one ms), irrespective of which numerology is used by the user terminal (for example, UE (User Equipment)).

On the other hand, slots may serve as a time unit that is based on the numerology used by the user terminal. For example, if the subcarrier spacing is 15 kHz or 30 kHz, the number of symbols per slot may be seven or fourteen. Meanwhile, when the subcarrier spacing is 60 kHz or greater, the number of symbols per slot may be fourteen. In addition, a slot may include a plurality of minislots (subslots).

Generally, subcarrier spacing and symbol duration hold a reciprocal relationship. Therefore, as long as the number of symbols per slot (or minislot (subslot)) stays the same, the higher (wider) the subcarrier spacing, the shorter the slot length, and the lower (narrower) the subcarrier spacing, the longer the slot length. Note that "subcarrier spacing is high" may be paraphrased as "subcarrier spacing is wide," and "subcarrier spacing is low" may be paraphrased as "subcarrier spacing is narrow."

For such future radio communication systems, a study is in progress to support a UL control channel (hereinafter also referred to as a "short PUCCH") that is structured to be shorter in duration than the PUCCH formats of existing LTE systems (for example, LTE Rel. 13 and/or earlier versions) and/or a UL control channel (hereinafter also referred to as a "long PUCCH") that is structured to have a longer duration than the above short duration.

Figure 1A:
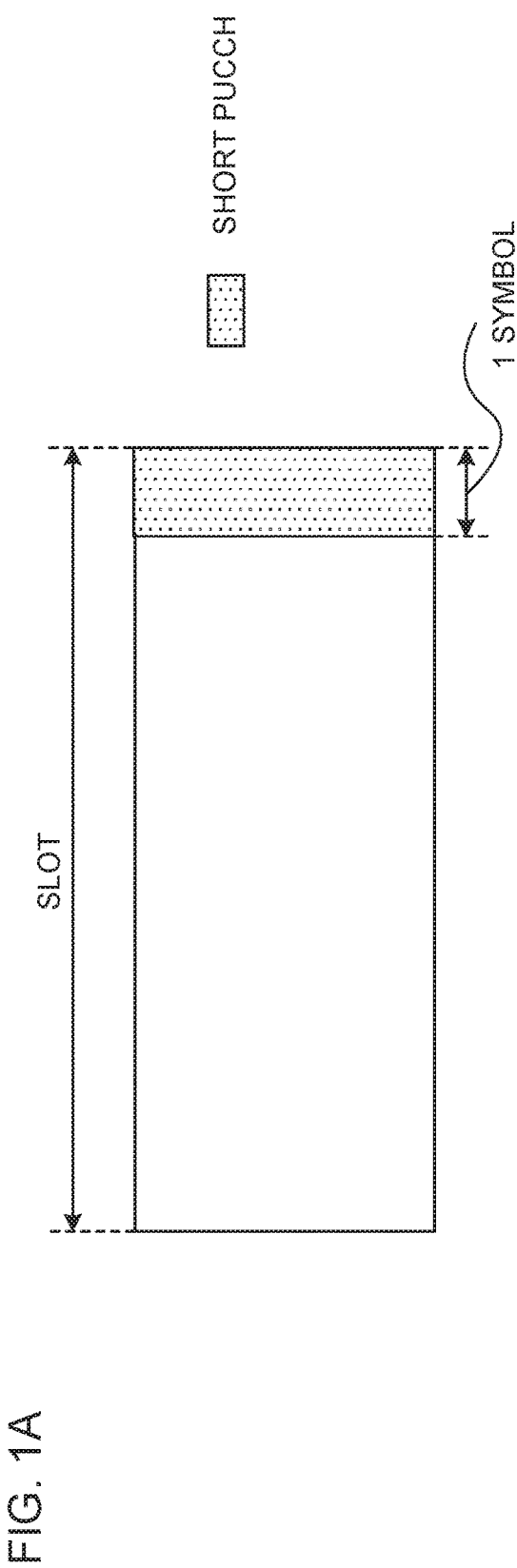
FIGS. 1A and 1B provide diagrams, each showing an example of the format of a UL control channel.
Figure 1B:
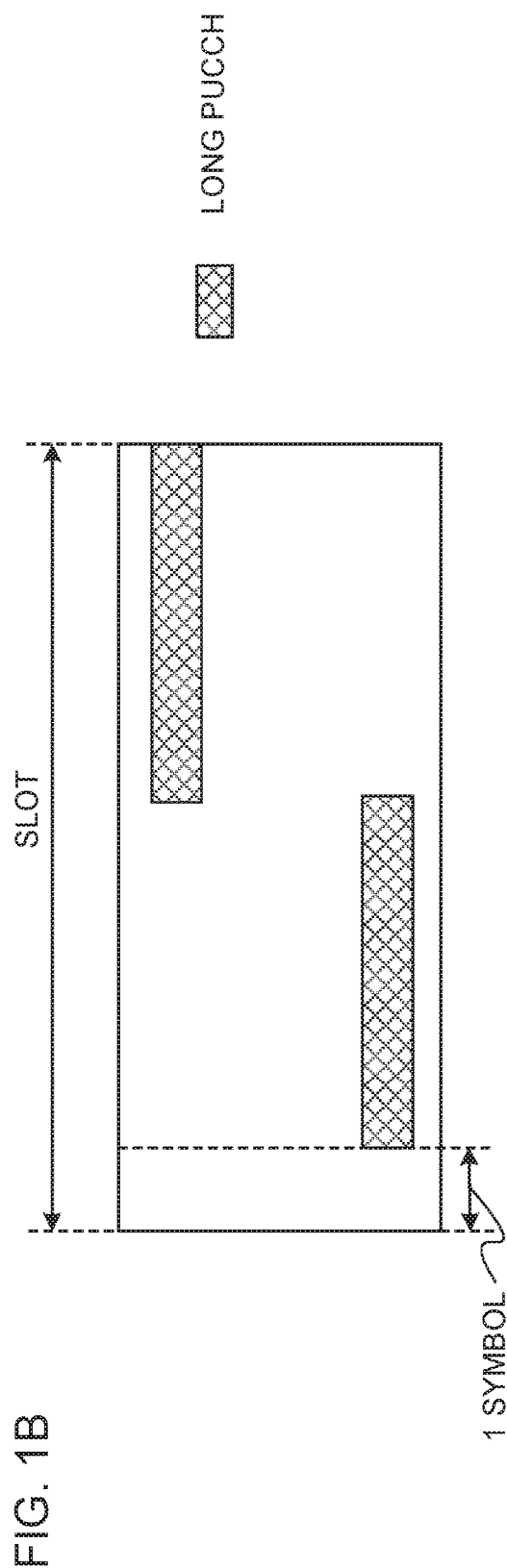

FIG. 1 provide diagrams, each showing an example of the format of a UL control channel in a future radio communication system. FIG. 1A shows an example of a short PUCCH, and FIG. 1B shows an example of a long PUCCH. As shown in FIG. 1A, a short PUCCH is arranged in a predetermined number of symbols (here, one symbol) from the end of the slot. Note that the symbol to arrange the short PUCCH is not confined to the end of a slot, and a predetermined number of symbols at the top or in the middle of a slot may be used as well. In addition, the short PUCCH is placed in one or more frequency resources (for example, one or more physical resource blocks (PRBs)).

Also, the short PUCCH may be time-division-multiplexed and/or frequency-division-multiplexed with the UL data channel (hereinafter also referred to as "PUSCH") within a slot. Also, within a slot, the short PUCCH may be time-division-multiplexed and/or frequency-division-multiplexed with the DL data channel (hereinafter also referred to as the "PDSCH") and/or the DL control channel (hereinafter also referred to as the "PDCCH (Physical Downlink Control Channel)").

With the short PUCCH, a multi-carrier waveform (for example, the OFDM (Orthogonal Frequency Division Multiplexing) waveform) may be used, or a single-carrier waveform (for example, the DFT-s-OFDM (Discrete Fourier Transform-Spread-Orthogonal Frequency Division Multiplexing) waveform) may be used.

Meanwhile, as shown in FIG. 1B, the long PUCCH is arranged over a plurality of symbols in the slot so as to improve the coverage over the short PUCCH. Referring to FIG. 1B, this long PUCCH is not arranged in a predetermined number of symbols (here, one symbol) at the top of the slot, but can be arranged in a predetermined number of symbols at the top. Also, the long PUCCH may be comprised of a number of frequency resources to match the short PUCCH, or the long PUCCH may be formed with a smaller number of frequency resources (for example, one or two PRBs) than the short PUCCH, in order to achieve a power boosting effect.

Also, the long PUCCH may be frequency-division-multiplexed with the PUCCH within a slot. In addition, the long PUCCH may be time-division-multiplexed with the PDCCH within a slot. Also, the long PUCCH may be placed with the short PUCCH in the same slot. For the long PUCCH, a single-carrier waveform (for example, DFT-s-OFDM waveform) may be used, or a multi-carrier waveform (for example, OFDM waveform) may be used.

Furthermore, as shown in FIG. 1B, to the long PUCCH, frequency hopping may be applied per predetermined duration within a slot (for example, per mini (sub) slot). This frequency hopping may be applied at the timing the number of transmission symbols becomes equal before and after the frequency hopping (for example, seven symbols if there are fourteen symbols per slot), or may be applied at a timing the number of symbols becomes uneven before and after the frequency hopping (for example, if there are fourteen symbols per slot, the timing the first half contains six symbols and the second half contains eight symbols).

When supporting such UL control channels of various formats (for example, a short PUCCH and/or a long PUCCH, and so on), it is necessary to implement the receiving (including decoding, detection, etc.) and/or transmission algorithm of each of these UL control channels. Consequently, there is a possibility that the burden of implementing UL control channels increases in radio base stations (also referred to as "gNodeBs," "transmission/reception points (TRPs)," etc.) and/or user terminals.

For example, UCI that is communicated in UL control channels contains at least one of, for example, retransmission control information in response to DL data (HARQ-ACK), a scheduling request (SR), channel state information (CSI), beam-identifying information (beam index (BI), which can be an antenna port number and/or the like), a buffer status report (BSR), power headroom (PHR), and other pieces of information. At least one combination of the above is indicated as a UCI type.

Note that the HARQ-ACK may be sent in response to one or more transport blocks (TBs), may be sent in response to one or more code blocks (CBs), may be sent in response to one or more component carriers (CCs) (cells), or may be sent in response to any combination of these. Also, the CSI and/or the BI may pertain to one or more slots, may pertain to one or more CCs (cells), or may pertain to any combination of these.

When the UCI type and/or the desired received quality are different (for example, when the target SINR (Signal-to-Interference plus Noise power Ratio) is different), a UL control channel of a format, in which at least one of the payload, the number of users to be multiplexed, the amount of resources to be occupied and so on is different, is used. So, when the value of the UCI type and/or the desired received quality (for example, the target SINR) increases, radio base stations and/or user terminals need to implement the receiving (including decoding, detection, etc.) and/or transmission algorithms of more UL control channels. Therefore, it is desirable to simplify the formats of UL control channels, and reduce the burden of implementation in user terminals and/or radio base stations.

Therefore, the present inventors have investigated ways of supporting various UL control channels (for example, a short PUCCH, a long PUCCH and so on) while reducing the burden of implementation, and arrived at the present invention. To be more specific, the present ors have come up with the idea of providing short PUCCHs and long PUCCHs in a common format, by forming a long PUCCH with short PUCCHs that are lined up in the time direction, where a short PUCCH is one unit.

Now, the present embodiment will be described below in detail. Assume that, with the present embodiment, a user terminals supports one or more subcarrier spacings (for example, 15 kHz, 30 kHz, 60 kHz, 120 kHz, 240 kHz, etc.). Although cases will be illustrated below where the subcarrier spacing in data symbols is 15 kHz, the subcarrier spacing for data symbols is by no means limited to 15 kHz.

(First Aspect)

According to a first aspect of the present invention, a long PUCCH (a UL control channel having a first duration) is constituted by a plurality of PUCCH units, and each of these multiple PUCCH units is constituted by a short PUCCH (a UL control channel having a second duration). Here, a PUCCH unit (unit) is the smallest constituent unit of a PUCCH. Now, the format of a short PUCCH, which serves as a PUCCH unit, and the format of a long PUCCH, which uses multiple PUCCH units, will be described below.

<Format of Short PUCCH>

In the first aspect of the present invention, a short PUCCH is constituted by a predetermined number of symbols (for example, one symbol or two symbols) of a given subcarrier spacing. In this short PUCCH, UCI and a reference signal (RS) may be time-division-multiplexed or frequency-division-multiplexed. The RS may be, for example, a demodulation reference signal (DMRS: DeModulation Reference Signal), which is used to demodulate the UCI.

For this short PUCCH, either a single-carrier waveform (for example, the DFT-s-OFDM waveform) or a multi-carrier waveform (for example, the OFDM waveform) may be used. The subcarrier spacing in each symbol of the short PUCCH may be the same as or higher than the subcarrier spacing in symbols for data channels (also referred to as "data," "PUSCH," "PDSCH," etc.) (hereinafter also referred to as "data symbols").

Figure 2A:
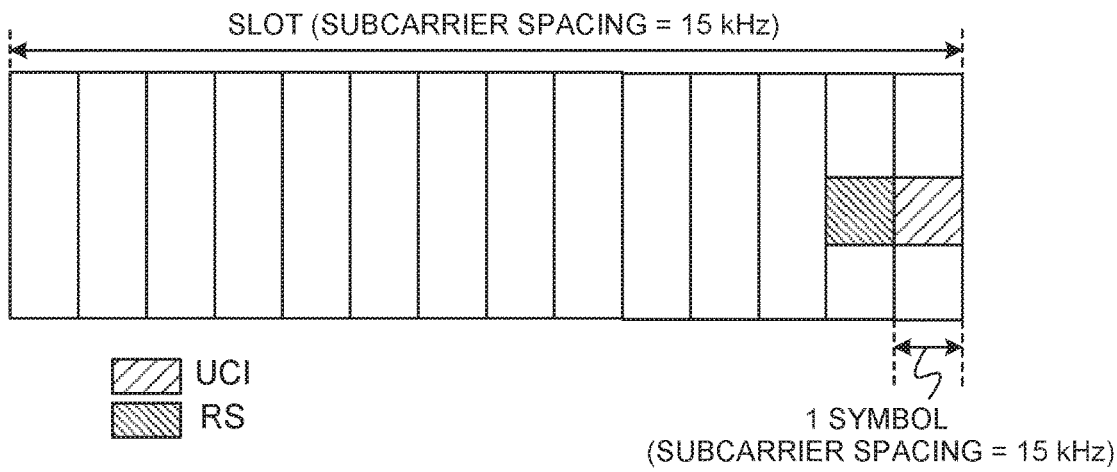
FIGS. 2A to 2C provide diagrams, each showing an example of the format of a short PUCCH, according to a first aspect of the present invention.
Figure 2B:
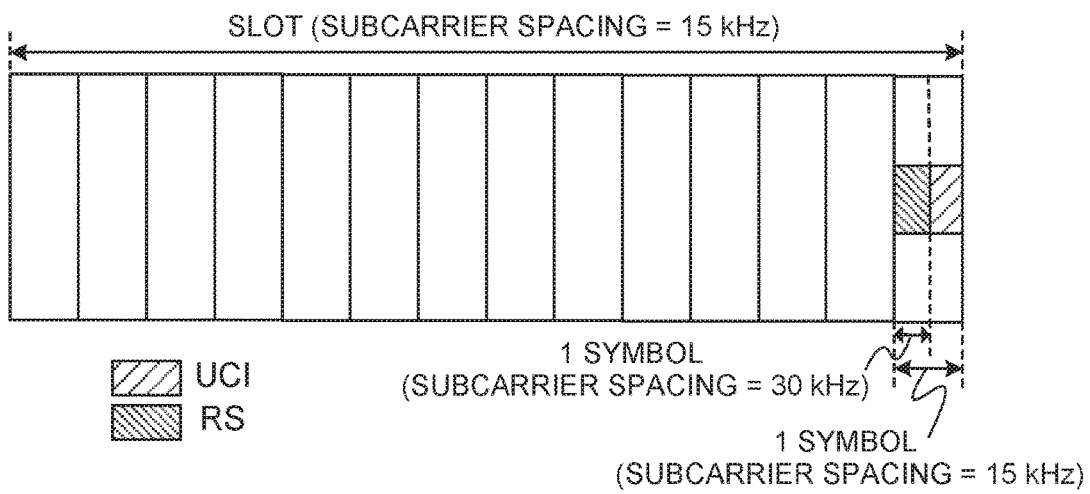
Figure 2C:
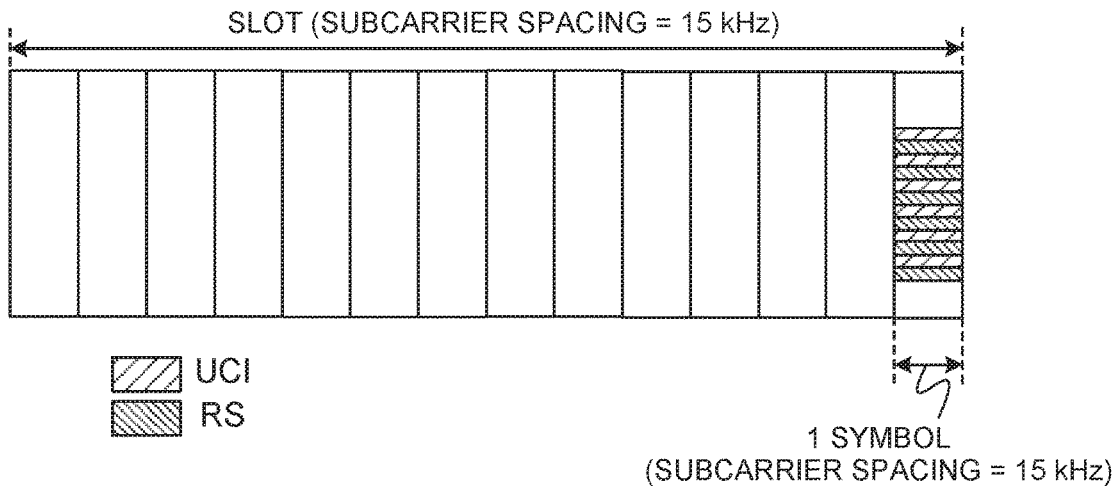

FIG. 2 provide diagrams, each showing an example of the format of a short PUCCH according to the first aspect. FIGS. 2A to 2C show examples, in which the subcarrier spacing in data symbols is 15 kHz, and in which a slot is constituted by fourteen symbols provided at a subcarrier spacing of 15 kHz. The subcarrier spacing for data symbols is by no means limited to 15 kHz, acid the number of symbols in a slot is not limited to fourteen.

As shown in FIG. 2A, in a short PUCCH, UCI and an RS may be time-division-multiplexed in a plurality of symbols provided at the same subcarrier spacing as that of data symbols. In this short PUCCH, the UCI and the RS are arranged in different symbols. A multi-carrier waveform (for example, the OFDM waveform) or a single-carrier waveform (for example, the DFT-s-OFDM waveform) can be applied to this short PUCCH.

On the other hand, as shown in FIG. 2B, in a short PUCCH, UCI and an RS may be time-division-multiplexed in a plurality of symbols provided at a higher subcarrier spacing than that of data symbols. Assuming that there is one symbol having a subcarrier spacing for data symbols (for example, 15 kHz), multiple symbols (for example, two symbols when the subcarrier spacing is 30 kHz) having a higher subcarrier spacing can be placed in this one symbol. In this short PUCCH, UCI and an RS are arranged different symbols provided at a higher subcarrier spacing than data symbols. A multi-carrier waveform (for example, the OFDM waveform) or a single-carrier waveform (for example, the DFT-s-OFDM waveform) can be applied to this short PUCCH.

Furthermore, as shown in FIG. 2C, in a short PUCCH, UCI and an RS may be frequency-division-multiplexed in a predetermined number of symbols (here, one symbol). In this short PUCCH, UCI and an RS are arranged in different frequency resources (for example, PRBs, resource units, resource elements, subcarriers etc.). If a single-carrier waveform is applied to this short PUCCH, there is a possibility that the PAPR may increase, so that a multi-carrier waveform (for example, OFDM) is suitable.

Although, in FIGS. 2A to 2C, the short PUCCH is provided at the end of each slot, the short PUCCH is by no means limited to this position. Also, although, in FIG. 2C, the subcarrier spacing in the single symbol constituting the short PUCCH is 15 kHz and the same as in data symbols, this is by no means limiting.

<Format of Long PUCCH>

In the first aspect of the present invention, a short PUCCH structured as described above is used as one PUCCH unit, and a long PUCCH is formed by combining multiple PUCCH units. Now, a case will be described below, in which one PUCCH unit is constituted by the short PUCCH exemplified, in FIG. 2A. Note that one PUCCH unit may be constituted by the short PUCCH exemplified in FIG. 2B or FIG. 2C.

In the first aspect of the present invention, UCI may be spread, repeated or encoded over these multiple PUCCH units (this UCI may be mapped a plurality of symbols, over a plurality of PUCCH units, by using at least one of spreading, repetition and coding).

A radio base station may receive a plurality of PUCCH units constituting a long PUCCH, combine the UCIs mapped to a plurality of symbols in these multiple PUCCH units, and improve the performance and/or the reliability UCI.

Figure 3A:
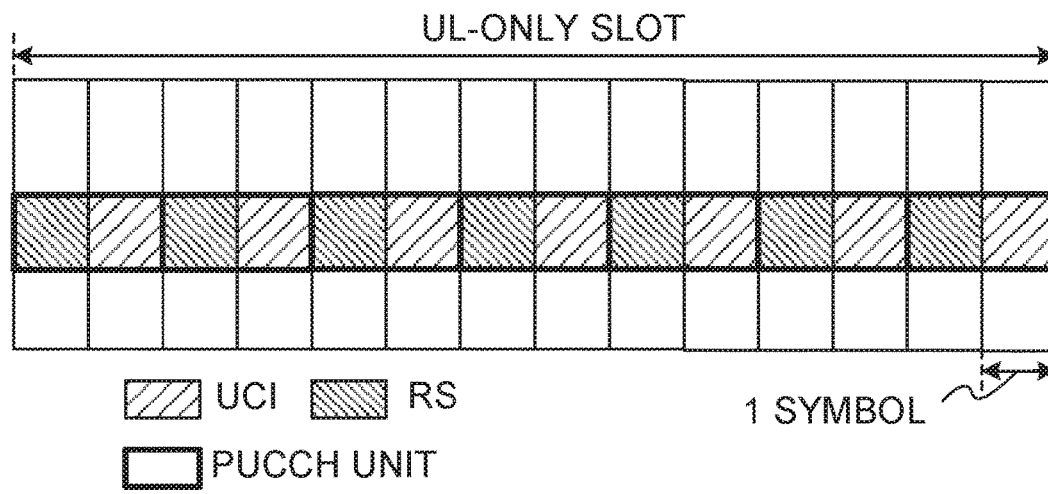
FIGS. 3A to 3B provide diagrams, each showing an example of the format of a long PUCCH, according to the first aspect.
Figure 3B:
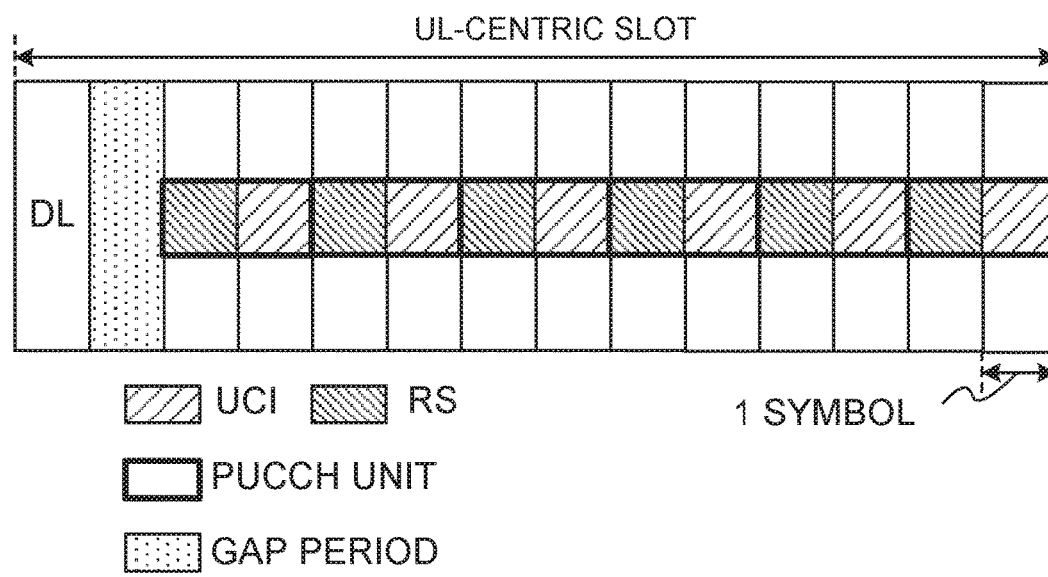

FIG. 3 provide diagrams, each showing an example of the format of a long PUCCH according to the first aspect of the present invention. FIG. 3A shows an example of a slot (UL-only slot), in which UL signals (for example, PUSCH and/or PUCCH) are transmitted/received, and FIG. 3B shows an example of a slot (UL-centric slot), in which DL signals (for example, PUCCH) are transmitted/received in a predetermined number of symbols (here, the first symbol), a symbol (gap period) for switching between DL and UL is provided, and UL signals (for example, PUSCH and/or PUCCH) are transmitted/received in the rest of the symbols. Note that the slots that can be used with a long PUCCH are by no means limited to UL-only slots and/or UL-centric slots.

In the UL-only slot shown in FIG. 3A, a long PUCCH is arranged over all of the fourteen symbols. This long PUCCH is formed by arranging seven PUCCH units, which are constituted by PUCCHs, in the time direction. With the short PUCCHs shown in FIG. 3A, UCI is mapped over seven symbols in different PUCCH units, using at least one of spreading, repetition and coding. The radio base station combines the UCIs mapped to these seven symbols.

In the UL-centric slot of FIG. 3B, a long PUCCH is placed over twelve symbols for UL signals. The long PUCCH is formed by arranging six PUCCH units, which are constituted by short PUCCHs, in the time direction. With the short PUCCHs shown in FIG. 3B, UCI is mapped over six symbols in different PUCCH units, using at least one of spreading, repetition and coding. The radio base station combines the UCIs mapped to these six symbols.

Note that whether given slot is a UL-only slot or a UL-centric slot may be reported to a user terminal based on higher layer signaling such as RRC (Radio Resource Control) signaling and/or physical layer signaling such as downlink control information (DCI). Based on this report, the user terminal identifies the number of symbols for placing the long PUCCH.

In this way, by using a short PUCCH as a PUCCH unit, which is the minimum constituent of a PUCCH, and by combining multiple PUCCH units to form a long PUCCH, it is possible to simplify the format of a long PUCCH, and reduce the burden of implementation in user terminals and/or radio base stations.

<Frequency Hopping for Long PUCCH>

As described above, frequency hopping can be applied to a long PUCCH that is constituted by a plurality of PUCCH units. To be more specific, although, in FIGS. 3A and 3B, a plurality of PUCCH units that constitute a long PUCCH are arranged in the same frequency resources, at least two of these multiple PUCCH units maybe arranged in different frequency resources.

Figure 4A:
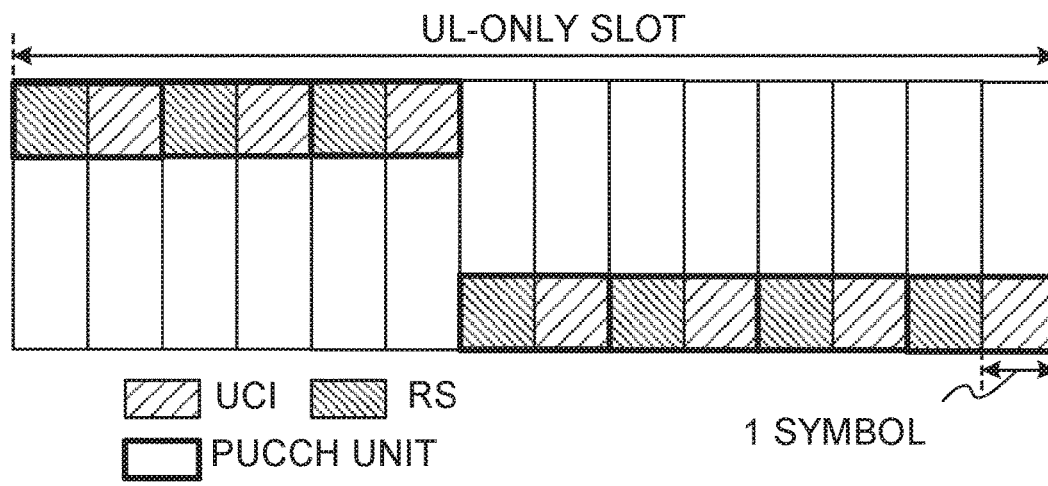
FIGS. 4A and 4B provide diagrams, each showing an example of frequency hopping for a long PUCCH, according to the first aspect.
Figure 4B:
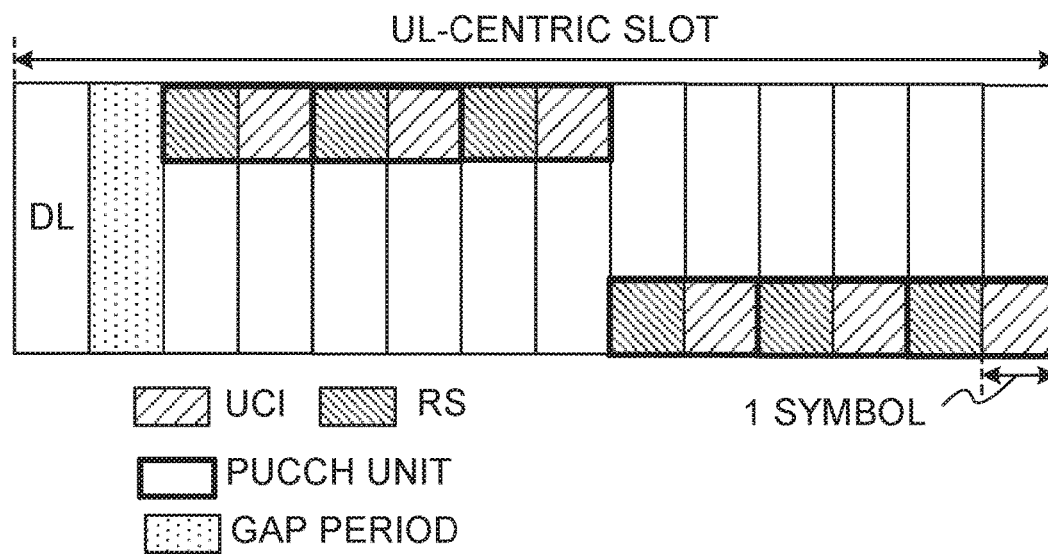

FIG. 4 provide diagrams, each showing an example of frequency hopping for a long PUCCH according to the first aspect. FIG. 4A shows an example of a UL-only slot, and FIG. 4B shows an example of a UL-centric slot. In FIGS. 4A and 4B, among the multiple PUCCH units constituting each long PUCCH, predetermined number of PUCCH units of the first half and a predetermined number of PUCCH units of the second half are arranged in different frequency resources (for example, PRBs).

For example, these different frequency resources may be the frequency resources at both ends of a predetermined band (for example, the band allocated to a user terminal), and frequency resources located a predetermined amount of frequency resources (for example, an integer multiple of PRBs) inside from both ends. In FIGS. 4A and 4B, the first three PUCCH units are arranged frequency resources on one side, and the remaining four or three PUCCH resources are arranged in frequency resources on the other side.

Although, in FIGS. 4A and 4B, a predetermined number of consecutive PUCCH units are arranged in the same frequency resources, the predetermined number of consecutive PUCCH units may be arranged in different frequency resources.

Figure 5A:
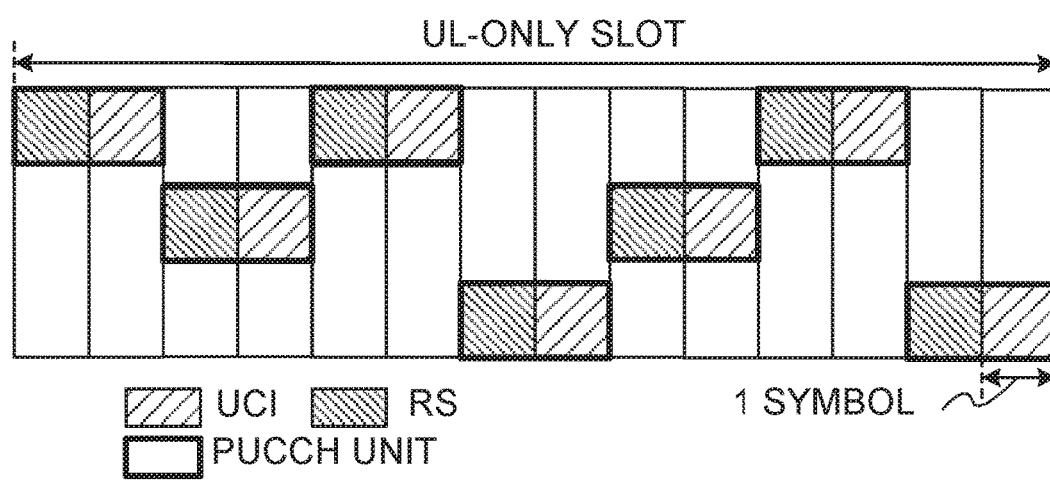
FIGS. 5A and 5B provide diagrams, each showing another example of frequency hopping for a long PUCCH, according to the first aspect.

FIG. 5 provide diagrams, each showing another example of frequency hopping for a long PUCCH according to the first aspect. As shown in FIG. 5A, among a plurality of PUCCH units that constitute a long PUCCH, temporally adjacent PUCCH units may be arranged in different frequency resources. Note that, although FIG. 5A shows a UL-only slot, similar frequency hopping can be applied to UL-centric slots as well.

Figure 5B:
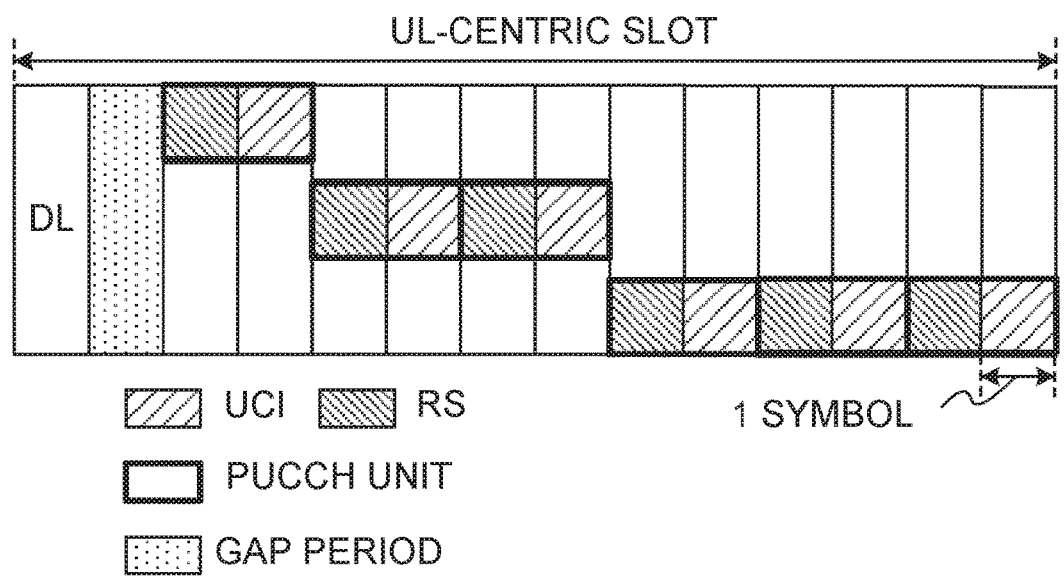

Also, as shown in FIG. 5B, a plurality of PUCCH units that constitute a long PUCCH may be classified into a predetermined number of groups (here, three groups), and these groups may be arranged in a different frequency resource. Note that, although FIG. 5B shows a UL-centric slot, similar frequency hopping can be applied to UL-only slots as well.

In this way, it is possible to achieve a frequency diversity gain by arranging at least two of multiple PUCCH units constituting a long PUCCH in different frequencies.

<Example of Controlling Long PUCCH>

In a slot in long PUCCH is arranged (for example, a UL-only slot, a UL-centric slot, etc.), a reference signal for channel state sounding (sounding reference signal (SRS)) and/or a gap period may be provided. In this case, the number of PUCCH units that constitute the long PUCCH (the number of PUCCH units) and/or the number of symbols in at least one PUCCH unit constituting the long PUCCH (the size) may be controlled based on the number of symbols in the slot where the SRS and/or the gap period are placed for example, the number of symbols where the long PUCCH can be arranged).

An example of controlling the number of PUCCH units that constitute a long PUCCH will be described below with reference to FIG. 6 and FIG. 7. As shown in FIG. 6 and FIG. 7, when an SRS and a gap period are arranged in a slot, the number of PUCCH units that constitute a long PUCCH may be controlled based on the number of symbols in the slot where the long PUCCH can be arranged.

Figure 6A:
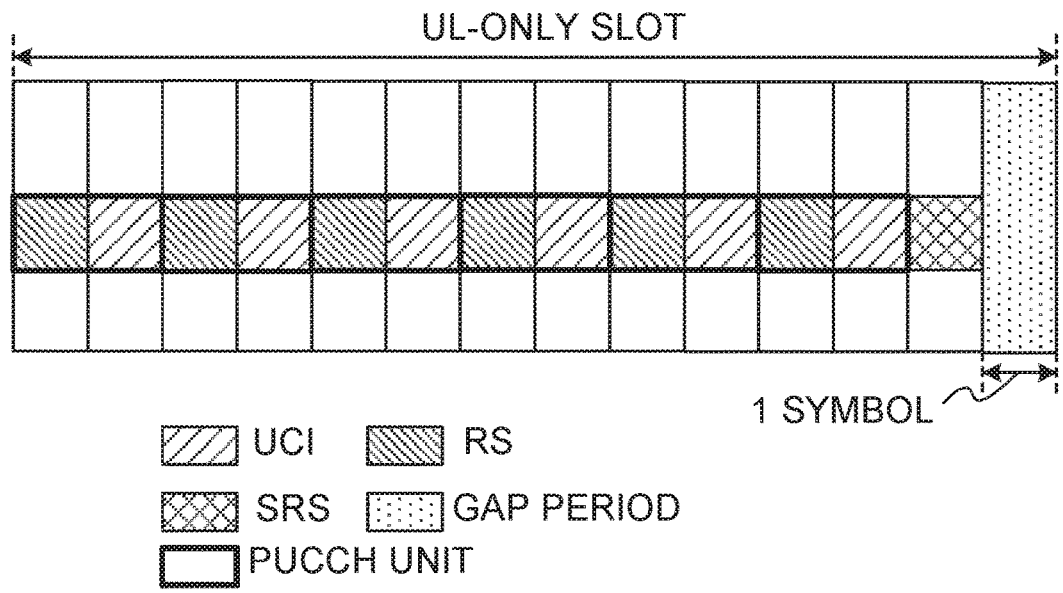
FIGS. 6A and 6B provide diagrams, each showing an example of controlling a long PUCCH, according to the first aspect.
Figure 6B:
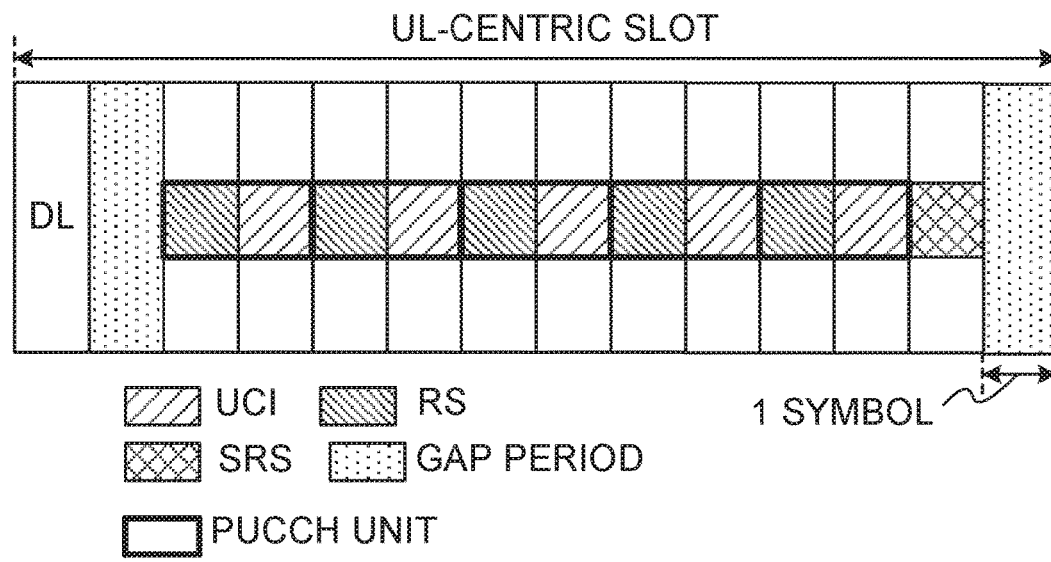

FIG. 6 show cases where frequency hopping is not applied to the long PUCCH. For example, in the UL-only slot shown in FIG. 6A, the long PUCCH can be arranged in twelve symbols, not including the symbols where the SRS and gap period lie, and, accordingly, the long PUCCH may be constituted by six PUCCH units. Also, in the UL-centric slot shown in FIG. 6B, the long PUCCH can be arranged in ten symbols for UL signals, not including the symbols where the SRS and the gap period lie, and, accordingly, the long PUCCH may be constituted by five PUCCH units.

In this way, when an SRS and a gap period are arranged in a slot, the number of symbols in the slot where a long PUCCH can be arranged decreases, so that the number of PUCCH units that constitute a long PUCCH may be reduced compared to when no SRS or gap period is arranged (see FIGS. 3A and 3B).

Figure 7A:
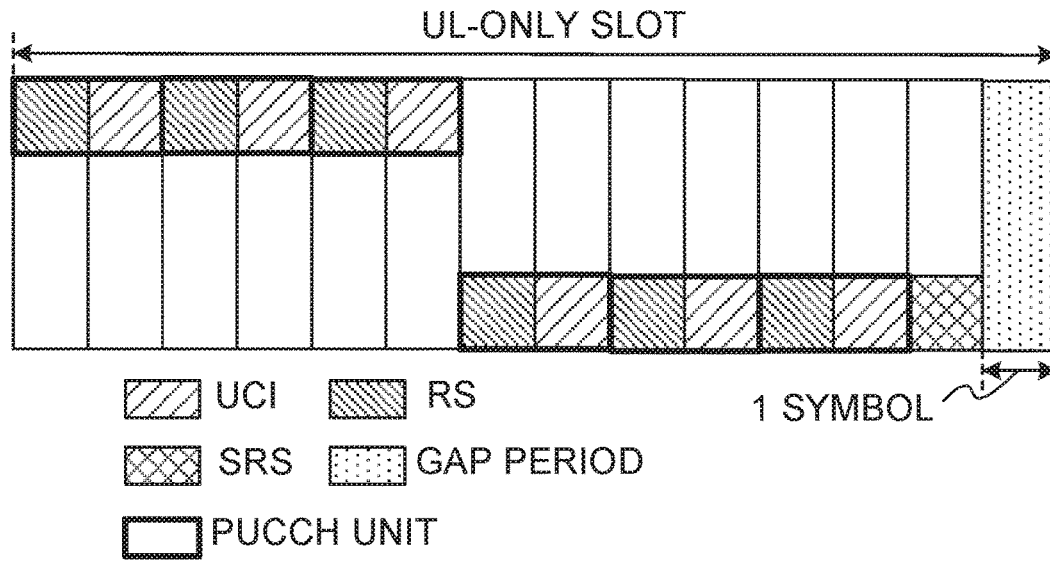
FIGS. 7A and 7B provide diagrams, each showing another example of controlling a long PUCCH, according to the first aspect.
Figure 7B:
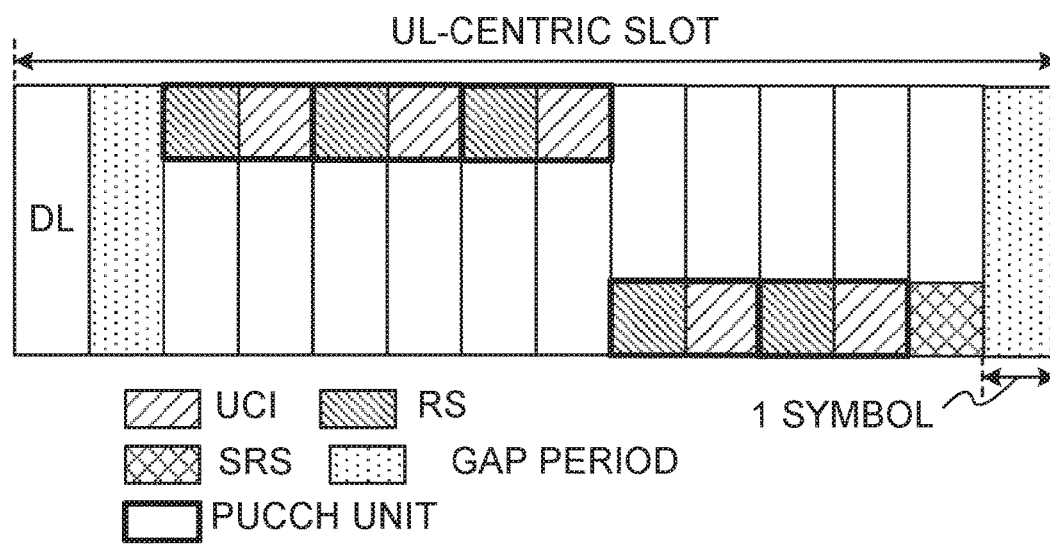

FIG. 7 show cases where frequency hopping is applied to a long PUCCH. As shown in FIGS. 7A and 7B, when frequency hopping is applied to a long PUCCH, if an SRS and a gap period are arranged in a slot, the number of symbols in the slot where the long PUCCH can be arranged in the slot decreases. Therefore, the number of PUCCH units that constitute the long PUCCH may be reduced compared to when no SRS or gap period is arranged (see FIGS. 4A and 4B).

Note that, referring to FIGS. 7A and 7B, when frequency hopping is applied to the long PUCCH, frequency hopping may be used in other locations (timings) depending on whether or rot at least one of the SRS, the gap period and the DL period is included in the slot. Improved performance can be achieved by making the amount of radio resources (symbols) the same before and after frequency hopping. Alternatively, by allow the amount of radio resources (symbols) to vary before and after frequency hopping, for example, it is possible to make the impact of interference from other cells, where the traffic is uneven, balanced within a slot.

Now, with reference to FIGS. 8 to 11, examples of controlling the number of PUCCH units that constitute a long PUCCH or the size of PUCCH units will be described. Assuming that an SRS is arranged in a slot, there may be cases where the number of symbols in the slot where a long PUCCH can be arranged is not an integer multiple of the number of symbols in a PUCCH (for example, two symbols).

In this case, the number of PUCCH units that constitute the long PUCCH may be reduced, and the SRS may be placed in the remaining symbols (see, for example, FIGS. 8A, 9A, 10A and 11A). Alternatively, the size of at least a part of the PUCCH units constituting the long PUCCH may be changed, and UCI may be placed in the remaining symbols (see, for example, FIGS. 8B, 9B, 10B and 11B).

In the cases shown in FIG. 8 and FIG. 9, frequency hopping is not applied to a long PUCCH, in a UL-only slot or in a UL-centric slot. Also, in FIG. 8 and FIG. 9, a PUCCH unit is constituted by two symbols, so that, if an SRS is placed in the last symbol in a slot, the second symbol from the last symbol in the slot becomes an unoccupied symbol.

Figure 8A:
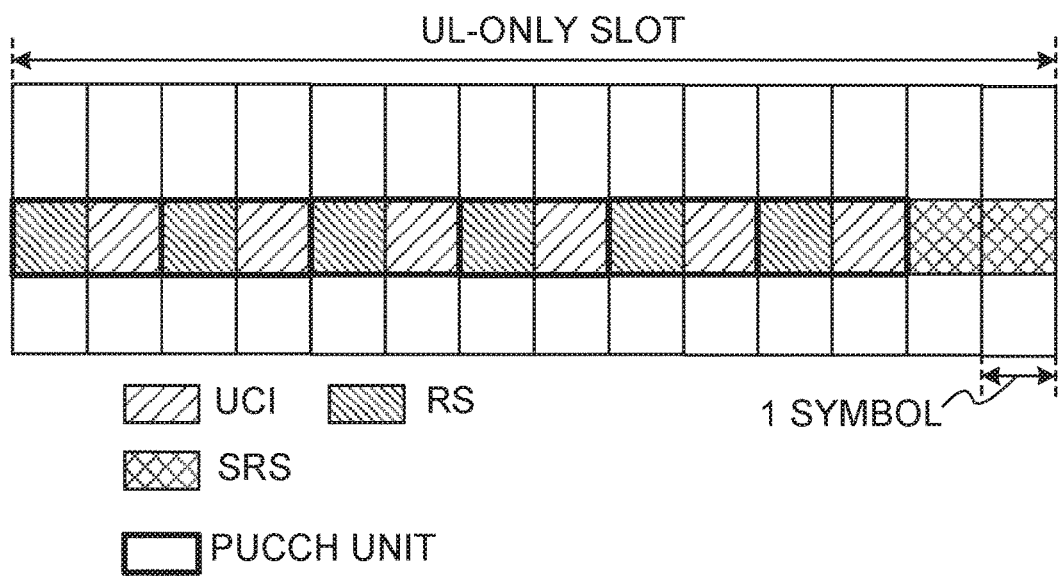
FIGS. 8A and 8B provide diagrams, each showing another example of controlling a long PUCCH, according to the first aspect.
Figure 8B:
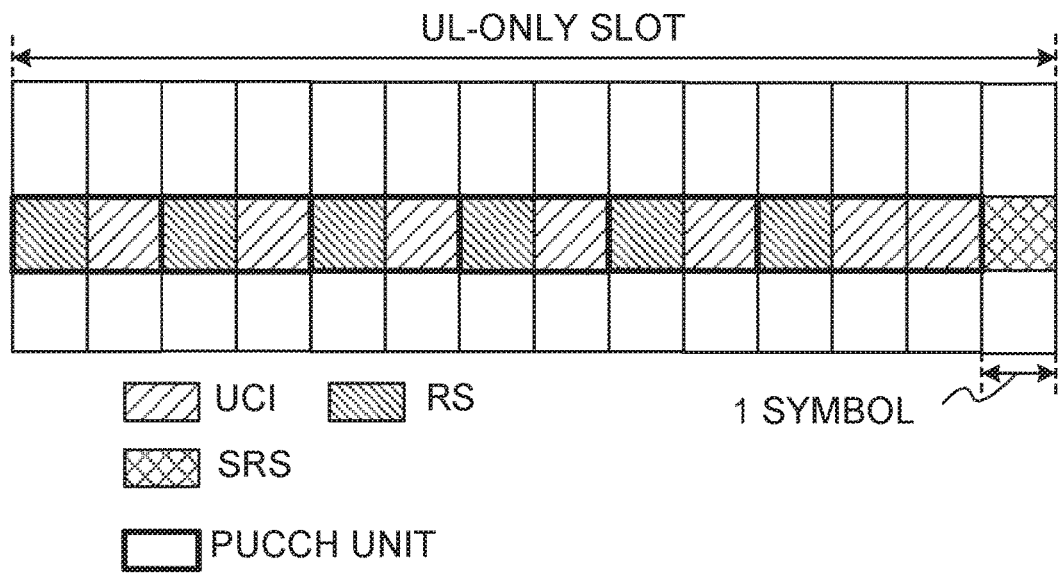
Figure 9A:
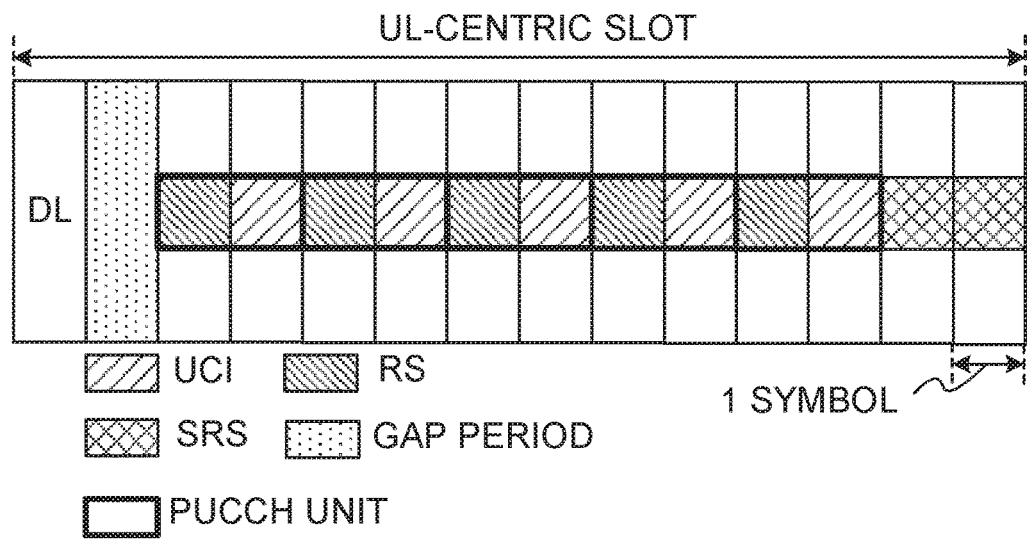
FIGS. 9A and 9B provide diagrams, each showing another example of controlling a long PUCCH, according to the first aspect.
Figure 9B:
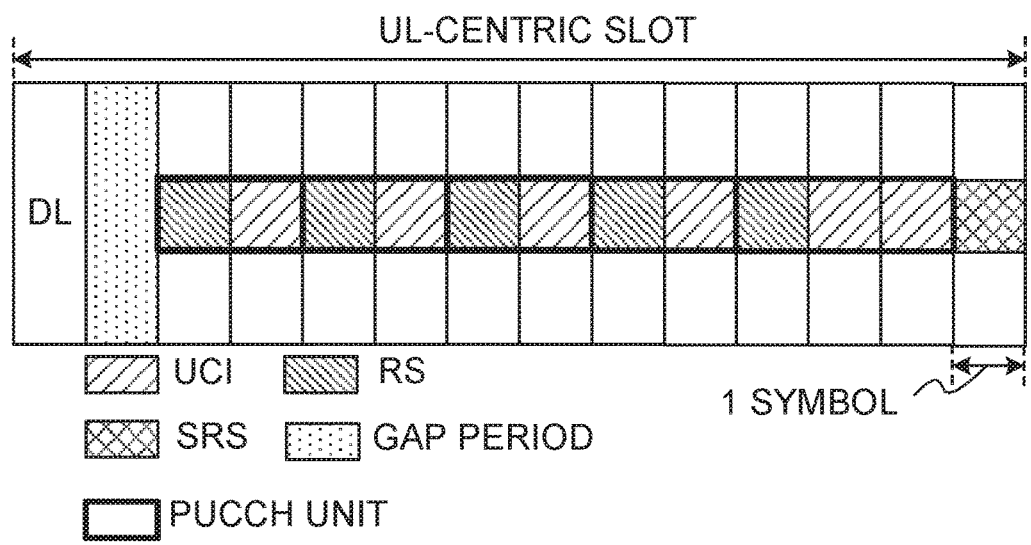

As shown in FIG. 8A and FIG. 9A, an SRS may be arranged in the second symbol from the end of a slot, which is an unoccupied symbol, in addition to the last symbol. Alternatively, as shown in FIG. 8B and FIG. 9B, UCI may be arranged in the second symbol from the end of a slot, which is an unoccupied symbol. In the cases shown FIG. 8B and FIG. 9B, the last PUCCH unit that constitutes each long PUCCH is expanded to three symbols. This allows the radio base stations to demodulate the UCI in the second symbol from the last, by using the RS in the fourth symbol from the last.

Figure 10A:
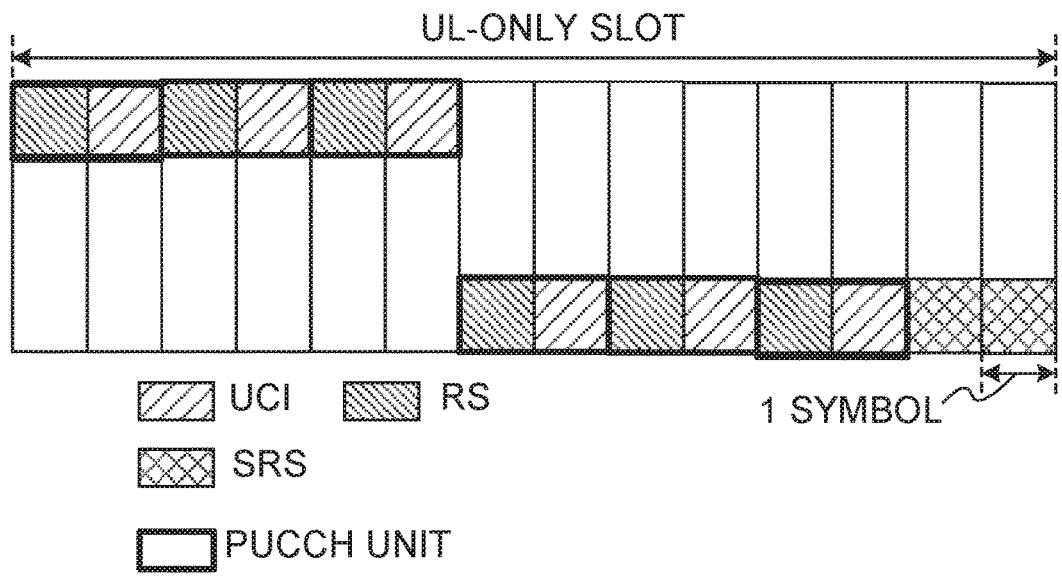
FIGS. 10A and 10B provide diagrams, each showing another example of controlling a long PUCCH, according to the first aspect.
Figure 10B:
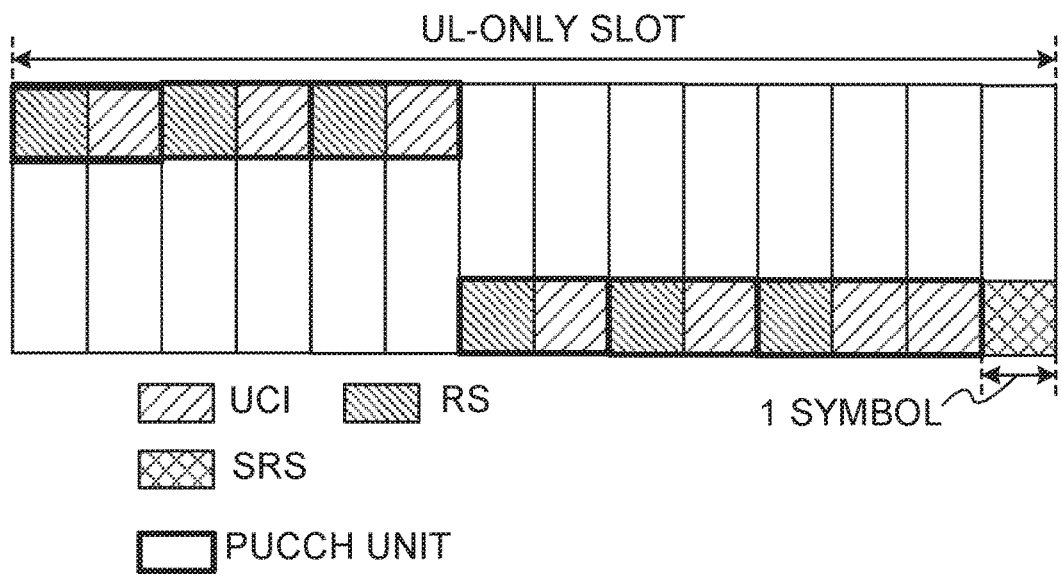
Figure 11A:
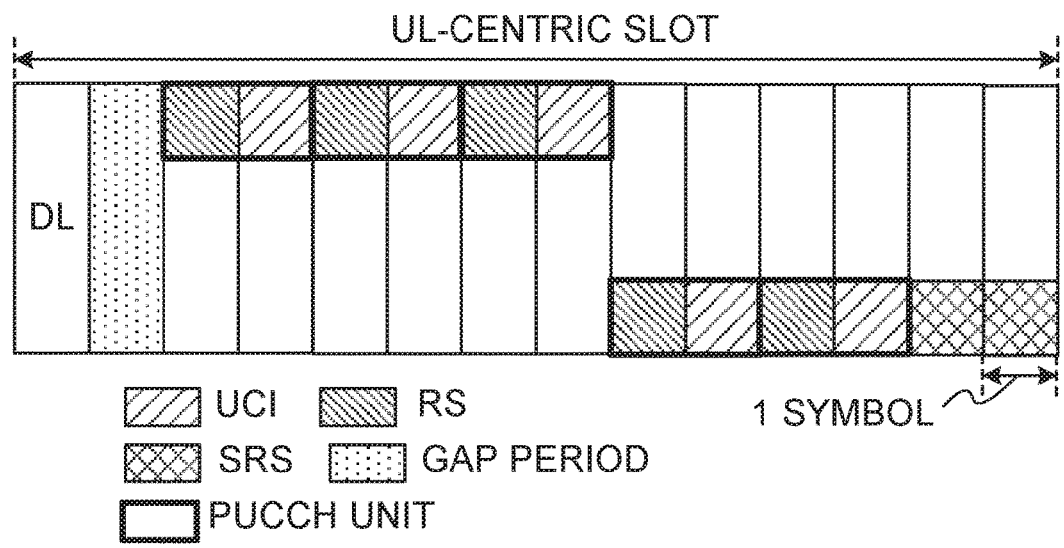
FIGS. 11A and 11B provide diagrams, each showing another example of controlling a long PUCCH, according to the first aspect.
Figure 11B:
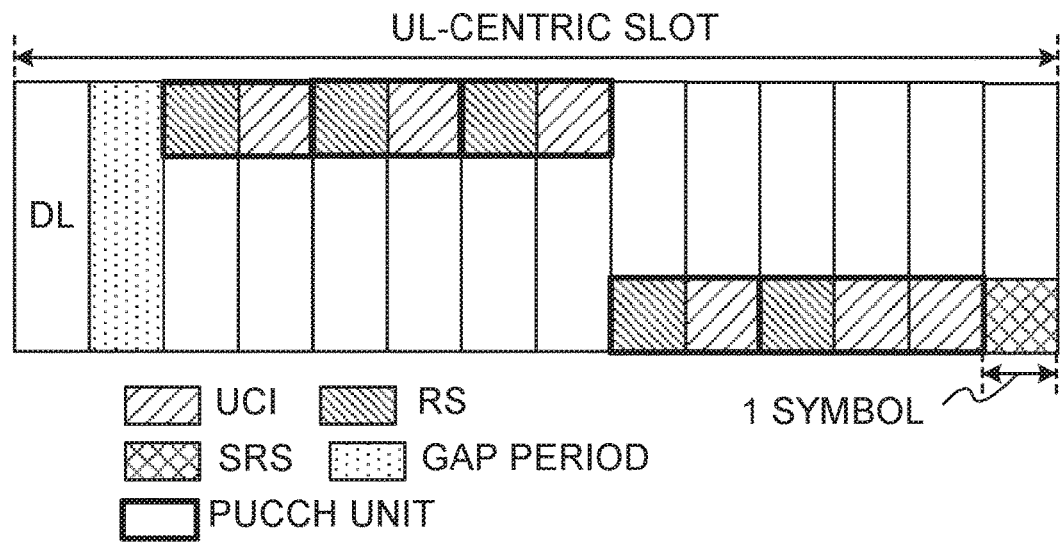

FIG. 10 and FIG. 11 show cases where frequency hopping is applied to a long PUCCH in a UL-only slot and in a UL-centric slot, respectively. Similar to FIG. 8 and FIG. 9, in FIG. 10 and FIG. 11, a PUCCH unit is formed with two symbols, so that, when an SRS is placed in the last symbol in a slot, the second symbol from the end of the slot becomes an unoccupied symbol. In this case, an SRS may be placed in this unoccupied symbol (see FIG. 10A and FIG. 11A), or UCI may be arranged there to expand the size of the last PUCCH unit constituting the long PUCCH (see FIG. 10B and FIG. 11B).

As described above, according to the first aspect of the present invention, a long PUCCH is constituted by a plurality of PUCCH units, which are each a short PUCCH, so that it is possible to simplify the format of a long PUCCH, and reduce the burden of implementation in user terminals and/or the radio base stations. Also, since the same UCI is transmitted in these multiple PUCCH units, the radio base stations can improve the quality of UCI by combining UCIs that are decoded per PUCCH unit.

(Second Aspect)

With a second aspect of the present invention, UCI, which is transmitted in a plurality of PUCCH units in a predetermined period (for example, a slot, a long PUCCH, etc.), will be described. In these multiple PUCCH units, the same UCI may be transmitted as described above with reference to the first aspect. Alternatively, different UCIs may be transmitted in at least some of these multiple PUCCH units.

Figure 12A:
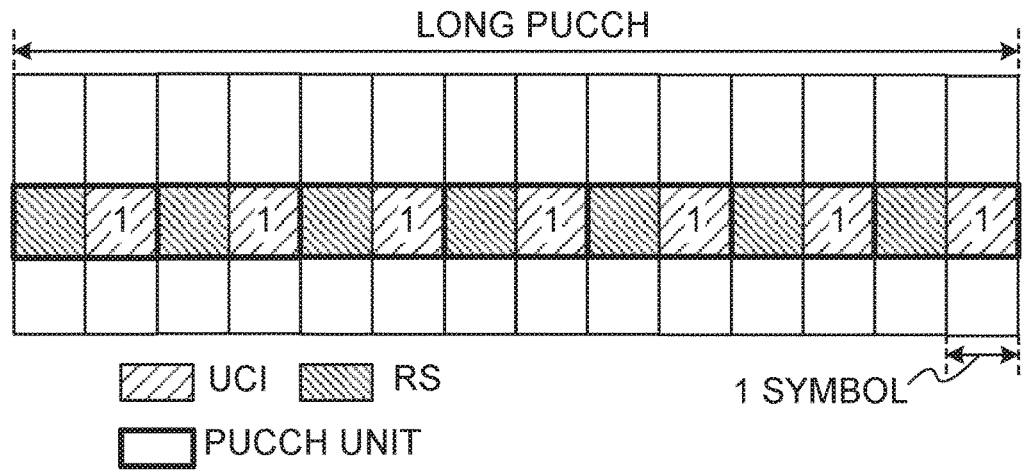
FIGS. 12A to 12C provide diagrams, each showing an example of multiplexing UCI according to a second aspect of the present invention.
Figure 12B:
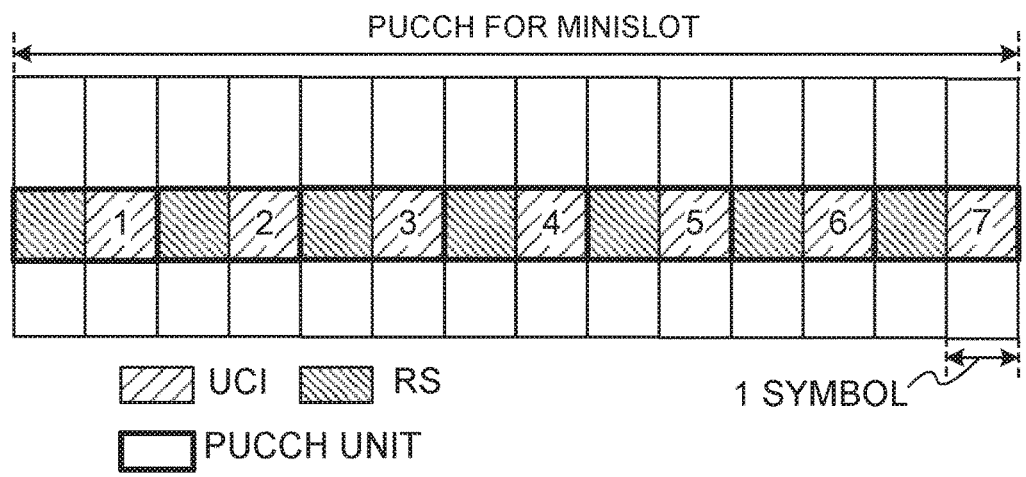

FIG. 12 provide diagrams to show examples of UCI, according to the second aspect of the present invention. In FIG. 12A, the same UCI (UCI #1 in FIG. 12A) is transmitted in each PUCCH unit that constitutes the long PUCCH. On the other hand, in FIG. 12B, different UCIs (UCI #1 to UCI #7 in FIG. 12B) are transmitted in each PUCCH unit in the slot.

The example shown in FIG. 12B is effective when multiple scheduling units are configured in a slot. For example, when a slot is formed with a plurality of minislots and DL data is scheduled on a per minislot basis, the example shown in FIG. 12B is suitable for transmitting HARQ-ACK in response to this DL data in subsequent minislots in the slot. Also, the example shown in FIG. 12B is likewise suitable for providing a plurality of short TTIs within the TTI.

Figure 12C:
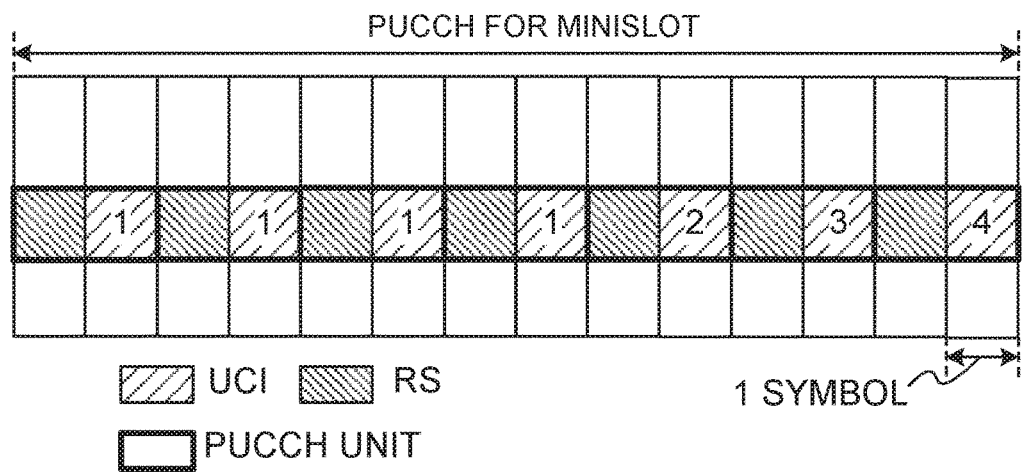

Alternatively, as shown in FIG. 12C, the same UCI may be transmitted in some PUCCH units in a slot, and different UCIs may be transmitted in the rest of the PUCCH units. For example, referring to FIG. 12C, the same UCI #1 is transmitted in four PUCCH units in the slot, and different UCIs #2, #3 and #4 are transmitted in the remaining three PUCCH units.

Note that, in FIGS. 12A and 12C, UCI #1 may be spread, repeated or encoded over multiple PUCCH units (the UCI may be mapped to a plurality of symbols in these multiple PUCCH units by using at least one of spreading, repetition and coding).

Although, in FIGS. 12A to 12C, all the PUCCH units in a slot are arranged in the same frequency resources, at least two PUCCH units in a slot may be placed in different frequency resources. Also, the formats shown in FIGS. 12B and 12C are not limited to UL-only slots, and can be applied to UL-centric slots, DL-centric slots in which DL signals (for example, PDSCH) are transmitted, and so on, as appropriate.

Also, in FIGS. 12B and 12C, a plurality of PUCCH units in which different UCIs are transmitted may be recognized as being a single long PUCCH, or may be recognized as being separate short PUCCHs.

Also, according to the second aspect of the present invention, how many PUCCH units are used to transmit the same UCI (that is, the number of PUCCH units transmitting the same UCI) may be indicated to a user terminal by way of higher layer signaling and/or physical layer signaling.

According to the second aspect, different UCIs can be transmitted in at least a part of the PUCCH units in a slot, so that, when a plurality of scheduling units (for example, minislots) are configured in a slot, it is possible to feed back HARQ-ACK, quickly, in responses to the DL data scheduled in these scheduling units.

(Third Aspect)

With a third aspect of the present invention, the positions of RSs in a predetermined period (for example, a slot, a long PUCCH, etc.) will be described. The positions of RSs in a slot may be fixed (first example of arrangement) or flexible (second example of arrangement).

FIRST EXAMPLE OF ARRANGEMENT

According to a first example of arrangement, the position of each RS in a predetermined period is fixed. On the other hand, whether each RS is present or absent in a predetermined period may be controlled per cell and/or per user terminal group (UE group). When an RS is absent, the symbol for the RS (RS symbol) may be used as a symbol for UCI (UCI symbol).

Figure 13:
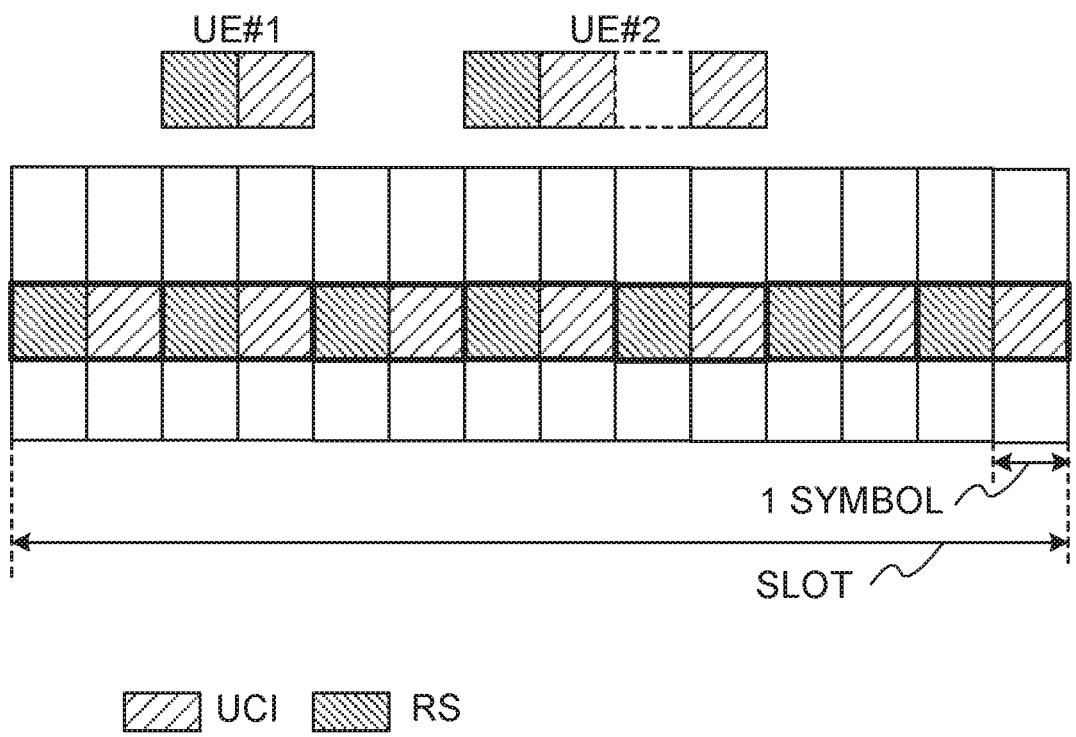
FIG. 13 is a diagram to show a first example of an arrangement of RSs according to a third aspect of the present invention.

Now, referring to FIG. 13 and FIG. 14, the first example of arrangement of RSs according to the third aspect of the present invention will be described below. Note that FIG. 13 and FIG. 14 each illustrate a case, as an example, where a long PUCCH is constituted by seven PUCCH units. In FIG. 13, a case is shown where an RS is present in each PUCCH unit a fixed position.

In FIG. 13, user terminal #1, using a single PUCCH unit, multiplexes an RS and UCI in this PUCCH unit. Meanwhile, user terminal #2, using a plurality of PUCCH units, multiplexes an RS and UCI some of these multiple PUCCH units, and in the rest of the PUCCH units, user terminal #2 maps UCI to the UCI symbol, but does not have to map an RS to the RS symbol. In this case, the RS symbol is unoccupied.

Figure 14A:
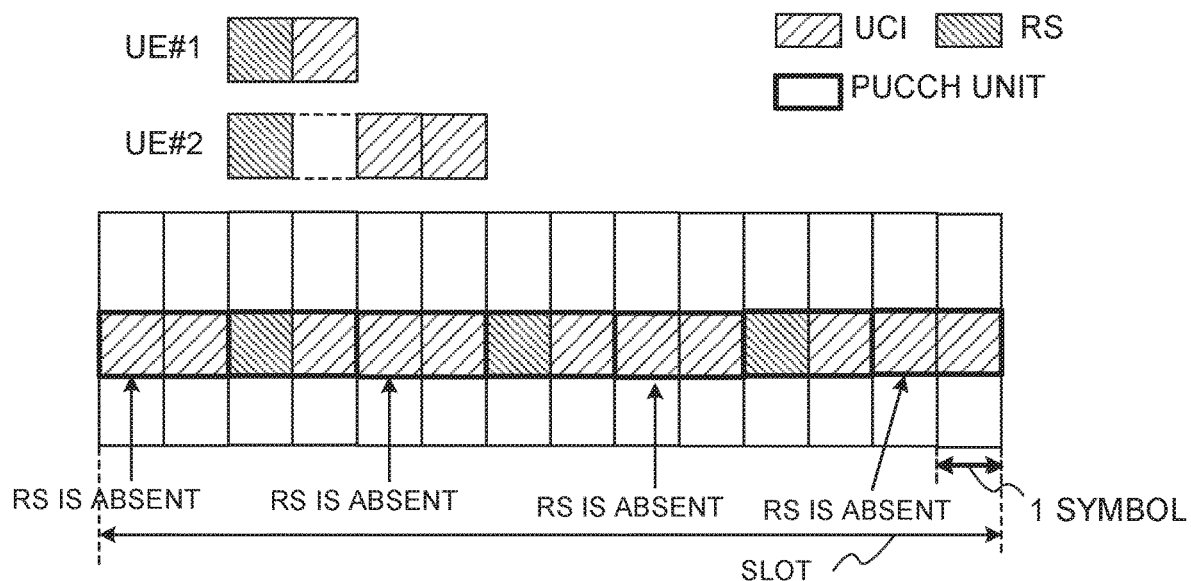
FIGS. 14A and 14B show other views of the first example of an arrangement of RSs according to the third aspect.

On the other hand, in the case shown in FIG. 14A, an RS is present in a fixed position in some of the PUCCH units, and there are no position-fixed RSs in the other the PUCCH units. For example, referring to FIG. 14A, the RS in the first, third, fifth mid seventh PUCCH in from the left are not present in a fixed position, while the RSs in the second, fourth and sixth PUCCH units from the left are present in a fixed position.

Referring to FIG. 14A, RSs for user terminals #1 and #2 may be multiplexed over the same RS symbol. RSs for multiple user terminals may be multiplexed by using comb-like subcarriers and/or by applying cyclic shifts, or at least one of frequency division multiplexing, time division multiplexing and space division multiplexing may be used.

For example, referring to FIG. 14A, RSs for user terminals #1 and #2 are code-division-multiplexed in the RS symbols in the second PUCCH unit from the left. Also, UCI for user terminal #1 is mapped to the UCI symbol in this PUCCH unit, and UCI for user terminal #2 is mapped to the two symbols in the next PUCCH unit.

Figure 14B:
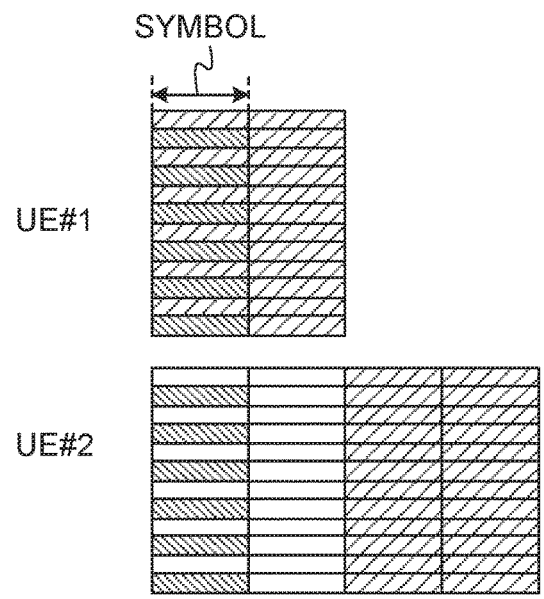

Also, as shown in FIG. 14B, when RSs for user terminals #1 and #2 are code-division-multiplexed in an RS symbol, UCI may be mapped to the unoccupied subcarriers. This UCI may be UCI for user terminal #1, whose UCI is mapped in the same PUCCH unit.

According to the first example of arrangements, whether an RS is present or absent in each PUCCH unit may be indicated to user terminals through higher layer signaling and/or physical layer signaling.

In the first example of arrangement, the position of an RS in a long PUCCH is fixed, and only its presence or absence is subject to control, so that it is possible to reduce the complication of processes accompanying the changing of RS positions, and, furthermore, reduce the overhead due to unnecessary RSs by controlling the presence or absence of RSs.

SECOND EXAMPLE OF ARRANGEMENT

In the second example of arrangement, the position of each RS in a predetermined period can be changed (is flexible). In this case, RSs and/or UCIs for one or more user terminals may be multiplexed by using at least one of time division multiplexing, code division multiplexing and space division multiplexing. Also, the density of RSs may be user terminal-specific. Also, the size of a PUCCH unit may be different between multiple user terminals.

Figure 15:
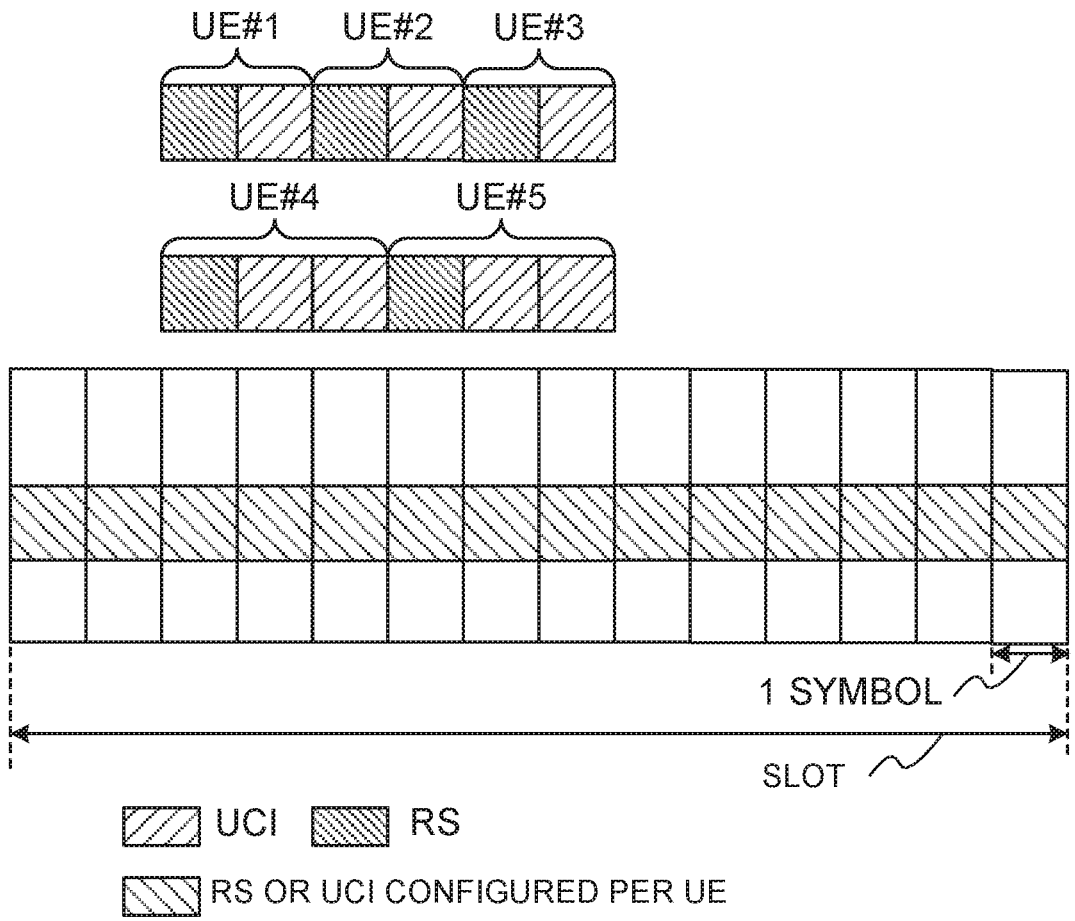
FIG. 15 is a diagram to show a second example of an arrangement of RSs according to the third aspect.

Now, referring to FIG. 15, a second example of arrangement of RSs according to the third aspect of the present invention will be described below. As shown in FIG. 15, RSs and UCIs may be freely multiplexed in a slot. For example, referring to FIG. 15, PUCCH units for user terminals #1 to #3 are time-division-multiplexed, while be PUCCH units for user terminals #1 to #3 and PUCCH units for user terminals #4 and #5 are code-division-multiplexed.

For example, referring to FIG. 15, an RS for user terminal #1 and an RS for user terminal #4 are code-division-multiplexed in the RS symbol for user terminal #1. UCI for user terminal #1 and an RS for user terminal #4 are code-division-multiplexed in the UCI symbol for user terminal #1. An RS for user terminal #2 and UCI for user terminal #4 are code-division-multiplexed in the RS symbol for user terminal #2. UCI for user terminal #2 and an RS for user terminal #5 are code-division-multiplexed in the UCI symbol for user terminal #2. An RS for user terminal #3 and UCI for user terminal #5 are code-division-multiplexed in the RS symbol for user terminal #3. UCI for user terminal #3 and UCI for user terminal #5 are code-division-multiplexed in the UCI symbol for user terminal #3.

With the second example of arrangement, the positions and/or the density of RSs can be changed freely, so that the RS-induced overhead can be reduced.

(Other Aspects)

In accordance with other aspects of the present invention, examples of controlling the number of symbols (size) in one or more PUCCH units that constitute a long PUCCH will be described in detail below. A long PUCCH may be constituted by a plurality of PUCCH units of the same size or by a plurality of PUCCH units of varying sizes. These multiple PUCCH units may be determined in advance and/or controlled.

For example, (1) the size of one or more PUCCH units that constitute a long PUCCH may be fixed based on the symbol where the PUCCH units start. Also, (2) the size of one or more PUCCH units may be configured by higher layer signaling. Also, (3) the size of the one or more PUCCH units may be configured by physical layer signaling. Also, the size of a plurality of PUCCH units that constitute a long PUCCH may be determined by combining (1) to (2) above.

FIG. 16 provide diagrams, each showing an example of controlling a long PUCCH, according to other aspects of the present invention. As shown in FIGS. 16A to 16D, a long PUCCH may be structured to include a plurality of PUCCH units of the same size and/or multiple PUCCH units of varying sizes.

Figure 16A:
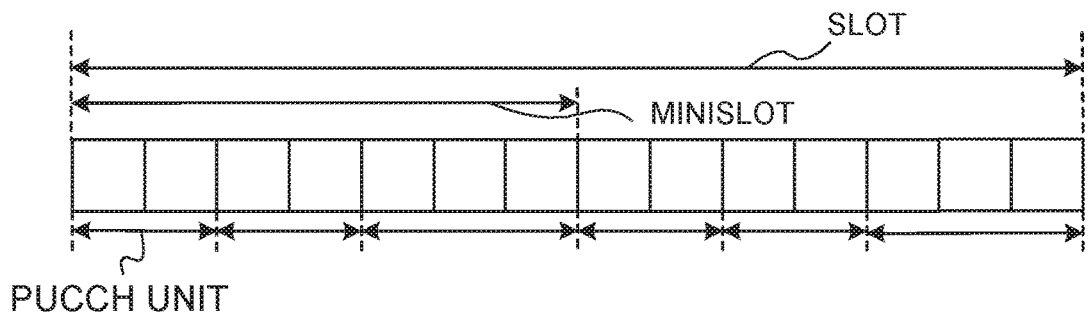
FIGS. 16A to 16D provide diagrams, each showing an example of controlling a long PUCCH according to another aspect of the present invention.

As shown in FIG. 16A, some of the PUCCH units in a slot may have a larger size than the other PUCCH units. For example, referring to FIG. 16A, in each minislot, the first two PUCCH units are two symbols, whereas the last PUCCH unit is three symbols.

Figure 16B:
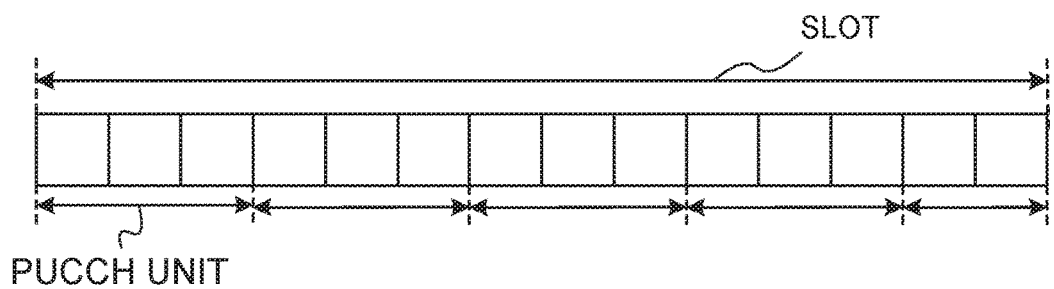
Figure 16C:
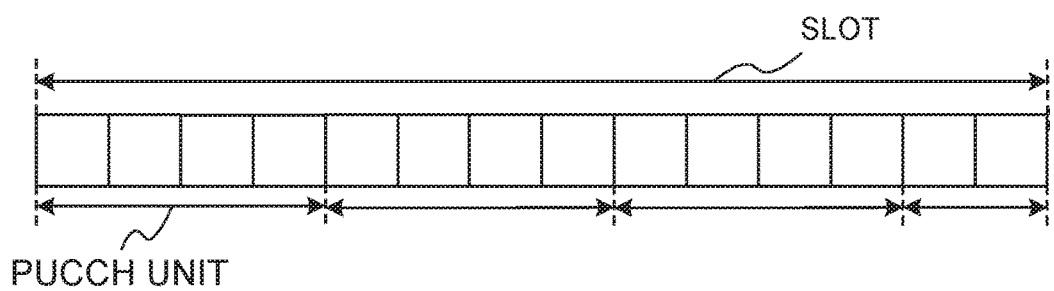

Also, as shown in FIGS. 16B and 16C, some of the PUCCH units in a slot (for example, the last PUCCH unit) may be smaller than the other PUCCH units. For example, referring to FIG. 16B, the first four PUCCH units in the slot are three symbols, whereas the last PUCCH unit is two symbols. Also, referring to FIG. 16C, the first three PUCCH units in the slot are four symbols, whereas the last PUCCH unit is two symbols.

Figure 16D:
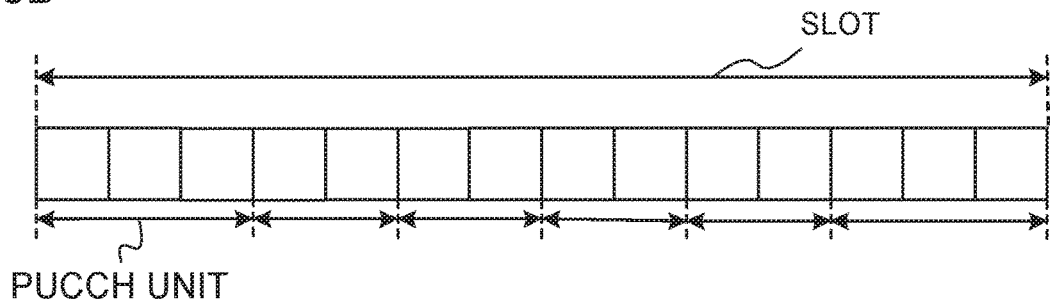

Also, as shown in FIG. 16D, the first PUCCH unit and the last PUCCH unit in a slot may be sized differently from the PUCCH units located between them. For example, referring to FIG. 16D, the first and the last PUCCH units in the slot are three symbols, whereas the PUCCH units located between them are two symbols.

(Radio Communication System)

Now, the structure of a radio communication system according to the present embodiment will be described below. In this radio communication system, each radio communication method according to the above-described embodiments is employed. Note that the radio communication methods according to the herein-contained aspects of the present invention may be applied individually, or two or more of them may be combined and applied.

Figure 17:
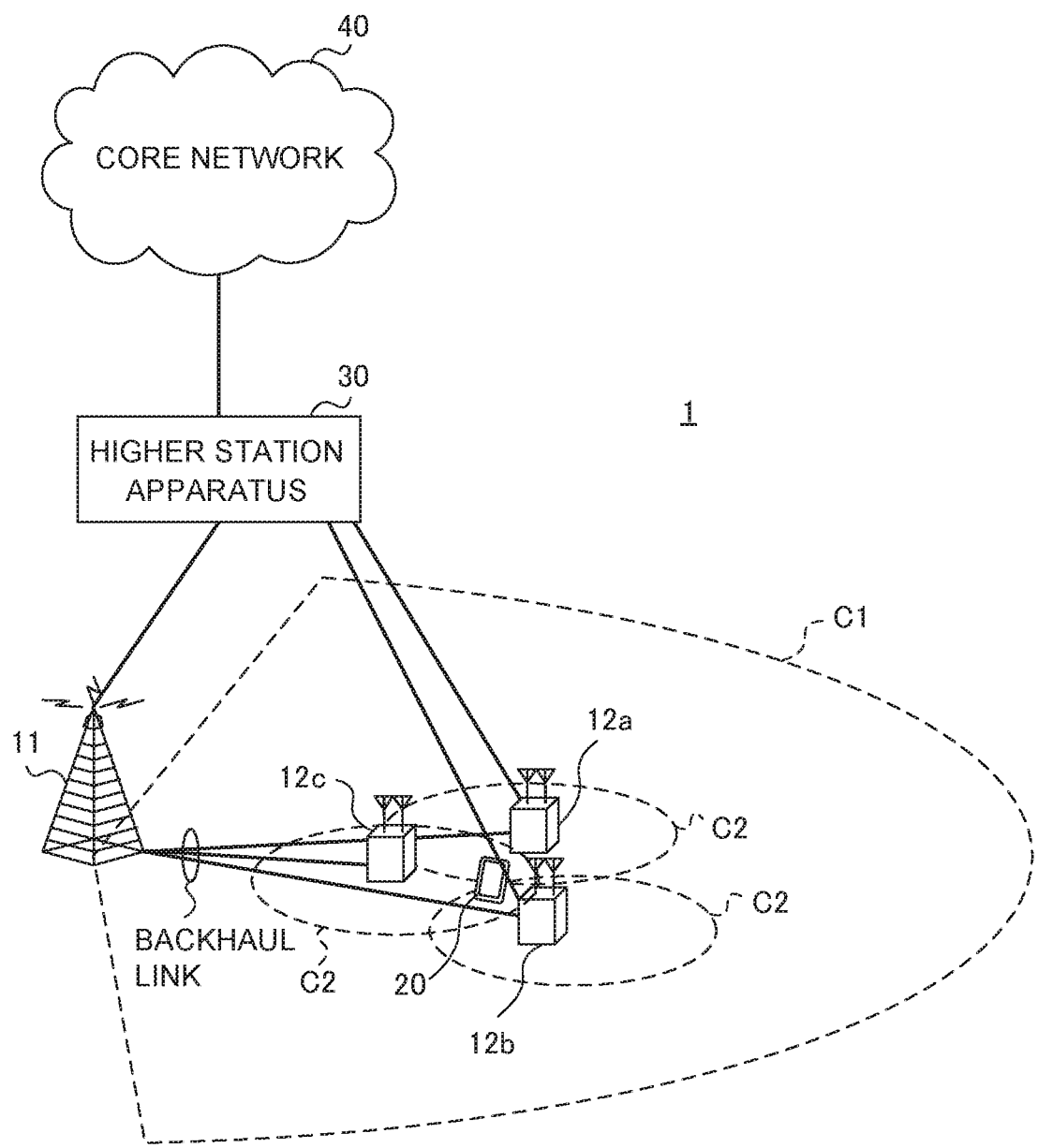
FIG. 17 is a diagram to show an example of a schematic structure of a radio communication system according to the present embodiment.

FIG. 17 is a diagram to show an example of a schematic structure of a radio communication system according to the present embodiment. A radio communication system 1 can adapt carrier aggregation (CA) and/or dual connectivity (DC) to group a plurality of fundamental frequency blocks (component carriers) into one, where the LTE system bandwidth (for example, 20 MHz) constitutes one unit. The radio communication system 1 may be also referred to as "SUPER 3G," "LIE-A (LTE-Advanced)," "IMT-Advanced," "4G," "5G," "FRA (Future Radio Access)," "NR (New RAT: New Radio Access Technology)," and so on.

The radio communication system 1 shown in FIG. 17 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells and/or within cells may be adopted.

Here, "numerology" refers to communication parameters in the frequency direction and/or the time direction (for example, at least one of the subcarrier spacing (subcarrier interval), the bandwidth, the symbol duration, the time duration of CPs (CP duration), the subframe duration, the time duration TTIs (TTI duration), the number of symbols per TTI, the radio frame structure, the filtering process, the windowing process, and so on). In the radio communication system 1, for example, subcarrier spacing of, for example, 15 kHz, 30 kHz, 60 kHz, 120 kHz and 240 kHz may be supported.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Furthermore, in each cell (carrier), a single numerology may be employed, or a plurality of different numerologies may be employed.

Between the user terminals 20 and the radio base station 11, communication can be carried out using a carrier of a relatively low frequency band (for example, 2 GHz) and a narrow bandwidth (referred to as an "existing carrier," "legacy carrier" and so on). Meanwhile, between the user terminals 20 and the radio base stations 12, a carrier of a relatively high frequency band (for example, 3.5 GHz, 5 GHz, 30 to 70 GHz and so on) da wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," "central node," an "eNB (eNodeB)," a "gNB (gNodeB)" a "transmitting/receiving point (TRP)" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "eNBs," "gNBs," "transmitting/receiving points (TRPs)" and so on. Hereinafter the radio base stations 11 and 12 will be collectively referred to as "radio base stations 10," unless specified otherwise.

The use terminals 20 are terminals to support various communication schemes such as LTE, LTE-A, 5G, NR and so on, and may be either mobile communication terminals or stationary communication terminals. Furthermore, the user terminals 20 can perform inter-terminal (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

Also, in the radio communication system 1, a multi-carrier waveform (for example, the OFDM waveform) may be used, or a single-carrier waveform (for example, the DFT-s-OFDM waveform) may be used.

In the radio communication system 1, a DL shared channel (PDSCH (Physical Downlink Shared CHannel), which is also referred to as, for example, a "DL data channel"), which is used by each user terminal 20 on a shared basis, a broadcast channel (PBCH (Physical Broadcast CHannel)), L1/L2 control channels and so on, are used as DL channels. User data, higher layer control information and SIBs (System Information Blocks) are communicated in the PDSCH. Also, the MIB (Master Information Block) is communicated in the PBCH.

The L1/L2 control channels include DL control channels (a PDSCH (Physical Downlink Control CHannel), an EPDCCH (Enhanced Physical Downlink Control CHannel) and so on), a PCFICH (Physical Control Format Indicator CHannel), a PHICH (Physical Hybrid-ARQ indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. It is possible to communicate HARQ retransmission control information (ACK/NACK) in response to the PUSCH using at least one of the PHICH, the PDCCH and the EPDCCH.

In the radio communication system 1, a UL shared channel (PUSCH: Physical Uplink Shared CHannel, which is also referred to as "UL data channel" and so on), which is used by each user terminal 20 on a shared basis, a UL control channel (PUCCH: Physical Uplink Control CHannel), a random access channel (PRACH: Physical Random Access CHannel) and so on are used as UL channels. User data, higher layer control information and so on are communicated by the PUSCH. Uplink control information (UCI), including at least one of DL signal retransmission control information (A/N), channel state information (CSI) and so on, is communicated in the PUSCH or the PUCCH. By means of the PRACH, random access preambles for establishing connections with cells are communicated.

<Radio Base Station>

Figure 18:
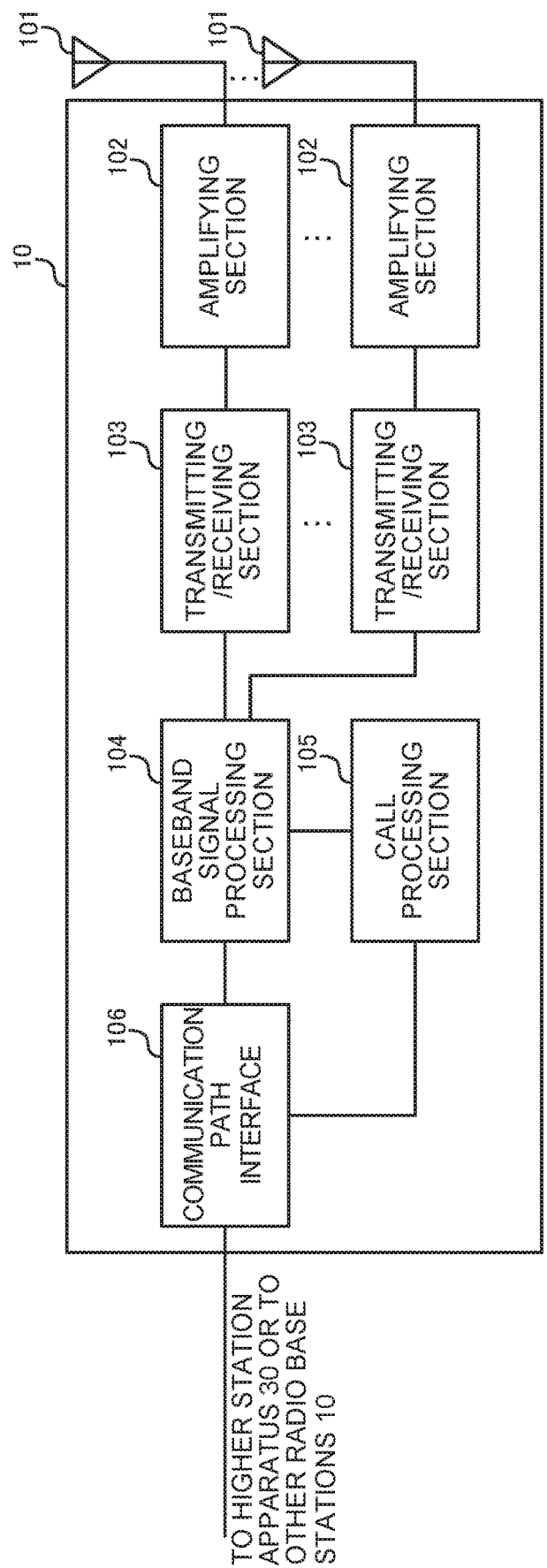
FIG. 18 is a diagram to show an example of an overall structure of a radio base station according to the present embodiment.

FIG. 18 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on DL is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a preceding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via alit inter-base station interface (for example, an interface in compliance with the CPRI (Common Public Radio Interface), such as optical fiber, the X2 interface, etc.).

In addition, the transmitting/receiving sections 103 transmit DL signals (including at least one of a DL data signal, a DL control signal and a DL reference signal) to the user terminal 20, and receive UL signals (including at least one of a UL data signal, a UL control signal and a UL reference signal) from the user terminal 20.

Furthermore, the transmitting/receiving sections 103 receive UCI from the user terminal 20 via a UL data channel (for example, the PUSCH) or a UL control channel (for example, a short PUCCH and/or a long PUCCH). The UCI may include at least one of HARQ-ACK in response to a DL data channel (for example, the PDSCH), CSI, SR, beam identifying information (for example, beam index (BI)) and a buffer status report (BSR).

In addition, the transmitting/receiving sections 103 may transmit control information (for example, at least one of the format, the number of PUCCH units in a slot, the size of the PUCCH unit, the method of multiplexing RSs, the positions for arranging RSs, the presence/absence of RSs, the density of RSs, the presence/absence of SRSs and the UL control channel resources) related to the UL control channel (for example, a short PUCCH, a long PUCCH, etc.) via physical layer signaling (L1 signaling) and/or higher layer signaling.

Figure 19:
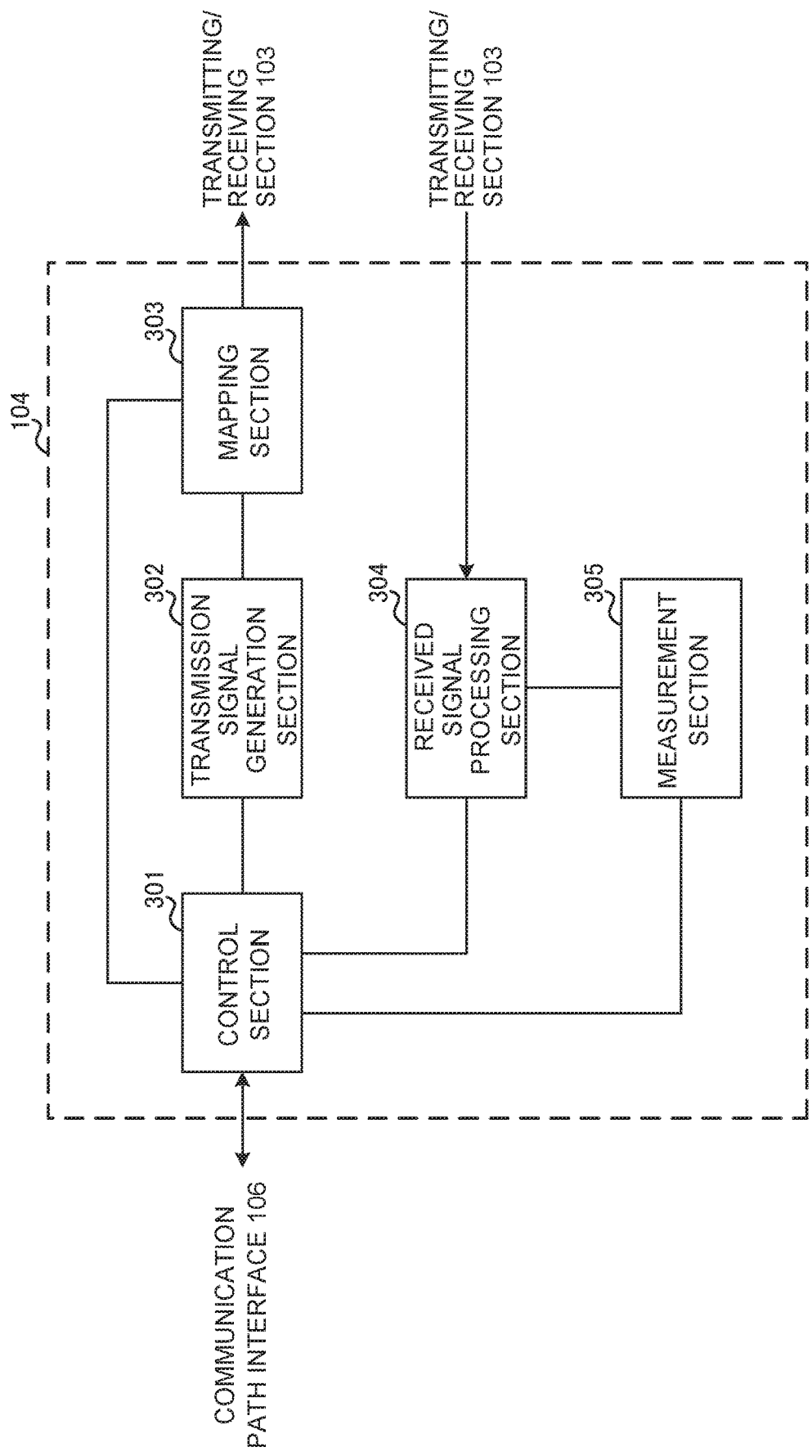
FIG. 19 is a diagram to show an example of a functional structure of a radio base station according to the present embodiment.

FIG. 19 is a diagram to show an example of a functional structure of a radio base station according to the present embodiment. Note that, although FIG. 19 primarily shows functional blocks that pertain to characteristic parts of the present embodiment, the radio base station 10 has other functional blocks that are necessary for radio communication as well. As shown FIG. 19, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, the generation of DL signals by the transmission signal generation section 302, the mapping of DL signals by the mapping section 303, the receiving processes (for example, demodulation) for UL signals by the received signal processing section 304 and the measurements by the measurement section 305.

To be more specific, the control section 301 schedules user terminals 20. To be more specific, the control section 301 may perform scheduling and/or retransmission control with respect to DL data and/or UL data channels based on UCI (for example, CSI and/or BI) from user terminals 20.

Furthermore, the control section 301 may control the format of UL control channels (for example, a long PUCCH and/or a short PUCCH) so that control information related to the UL control channels is transmitted.

Here, a long PUCCH (a UL control channel having a first duration) may be constituted by a plurality of PUCCH units (units), and each of these multiple PUCCH units may be constituted by a short PUCCH (a UL control channel having a second duration) (see the first aspect and FIG. 3). Also, at least two of these multiple PUCCH units may be arranged in different frequency resources (see the first aspect and FIGS. 4, 5, 7, 10 and 11). Also, a long PUCCH may be multiplexed with an SRS (see FIG. 6 to FIG. 11).

Also, in a short PUCCH, the UCI and the DMRS (the demodulation reference signal for the UCI) may be time-division-multiplexed between multiple symbols provided at the same subcarrier spacing as data symbols, or between multiple symbols provided at a higher subcarrier spacing than data symbols (see the first aspect and FIGS. 2A and 2B). Alternatively, in a short PUCCH, the UCI and the DMRS may be frequency-division-multiplexed (see the first aspect and FIG. 2C).

In addition, the control section 301 may control the received signal processing section 304 to combine the same UCI received in at least two of multiple PUCCH units, or restore different UCIs received in at least two of these multiple PUCCH units (see the second aspect and FIG. 12).

In addition, the control section 301 may control the positions to arrange RSs and/or the density of RSs in slots (or in a long PUCCH), and transmit control information to represent these arrangement positions and/or the density (see the third aspect and FIG. 13 to FIG. 15). Note that the control section 301 may fix the positions for arranging RSs, and control the presence or absence of RSs in these fixed arrangement positions. Alternatively, the control section 301 may control the arrangement of RSs in a flexible manner.

The control section 301 may control the received signal processing section 304 to perform the receiving process for UCI from the user terminal 20 in accordance with the format of the UL control channel.

The control section 301 can be constituted by a controller, a control circuit or control apparatus that can be described based on general understanding of the technical field to which the present invention pertains.

The transmission signal generation section 302 generates DL signals (including DL data signals, DL control signals, DL reference signals and so on) based on commands from the control section 301, and outputs these signals to the mapping section 303.

For the transmission signal generation section 302, a signal generator, a signal generation circuit or signal generation apparatus that can be described based on general understanding of the technical field to which the present invention pertains can be used.

The mapping section 303 maps the DL signals generated in the transmission signal generation section 302 to predetermined radio resources based on commands from the control section 301, and outputs these to the transmitting/receiving sections 103. For the mapping section 303, mapper, a mapping circuit or mapping apparatus that can be described based on general understanding be technical field to which the present invention pertains can be used.

The received signal processing section 304 performs receiving processes (for example, demapping, demodulation, decoding, etc.) of UL signals transmitted from the user terminals 20 (including, for example, a UL data signal, a UL control signal, a UL reference signal, etc.). To be more specific, the received signal processing section 304 may outputs the received signals, the signals after the receiving processes and so on, to the measurement section 305. In addition, the received signal processing section 304 performs UCI receiving processes based on the UL control channel format commanded from the control section 301.

The measurement section 305 conducts measurements with respect to the received signals. The measurement section 305 can be constituted by a measurer, a measurement circuit or measurement apparatus that can be described, based on general understanding of the technical field to which the present invention pertains.

Also, the measurement section 305 may measure the channel quality in UL based on, for example, the received power (for example, RSRP (Reference Signal Received Power)) and/or the received quality (for example, RSRQ (Reference Signal Received Quality)) of UL reference signals. The measurement-results may be output to the control section 301.

<User Terminals>

Figure 20:
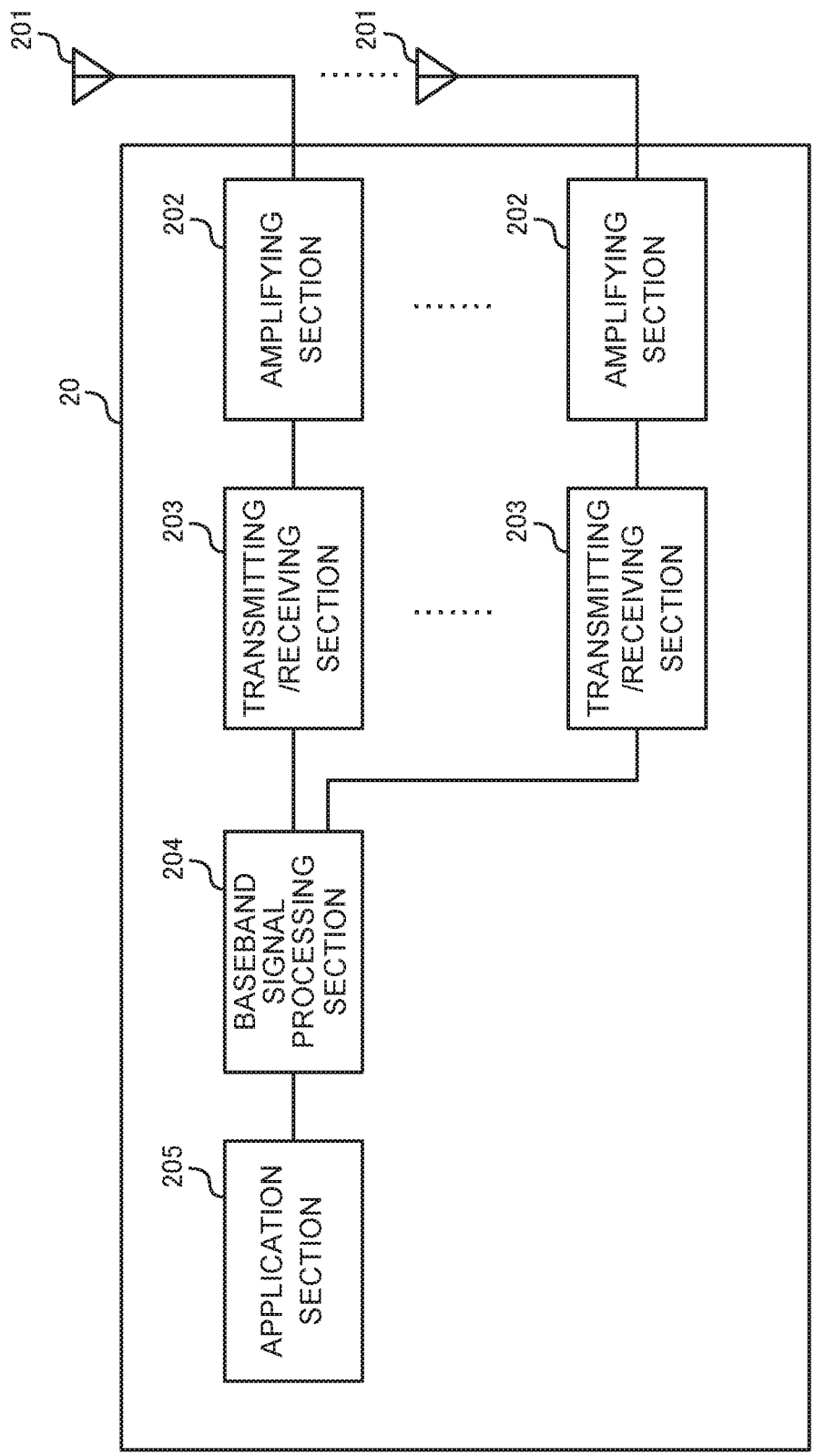
FIG. 20 is a diagram to show an example of an overall structure of a user terminal according to the present embodiment.

FIG. 20 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on. Also, the broadcast information is also forwarded to application section 205.

Meanwhile, the UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. The UCI is also subjected to at least one of channel coding, rate matching, puncturing, a DFT process and an IFFT process, and the result is forwarded to each transmitting/receiving section 203.

The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Furthermore, the transmitting/receiving sections 203 receive the DL signals (including DL data signals. DL control signals, DL reference signals, etc.) of the numerology configured in the user terminal 20, and transmits the UL signals (including UL data signals, UL control signals, UL reference signals, etc.) of the numerology.

In addition, the transmitting/receiving sections 203 transmit the UCI to the radio base station 10 using a UL data channel (for example, PUCCH) or a UL control channel (for example, a short PUCCH and/or a long PUCCH).

In addition, the transmitting/receiving sections 203 may receive control information (for example, at least one of the format, the number of PUCCH units in a slot, the size of a PUCCH unit, the method of multiplexing RSs, the positions of RSs, the presence or absence of RSs, the density of RSs, the presence or absence of SRSs and the UL control channel resources) related to a UL control channel (for example, a short PUCCH, a long PUCCH, etc.) via physical layer signaling (L1 signaling) and/or higher layer signaling.

For the transmitting/receiving sections 203, transmitters/receivers, transmitting/receiving circuits or transmitting/receiving apparatus that can be described based on general understanding of the technical field to which the present invention pertains can be used. Furthermore, a transmitting/receiving section 203 may be structured as one transmitting/receiving section, or may be formed with a transmitting section and a receiving section.

Figure 21:
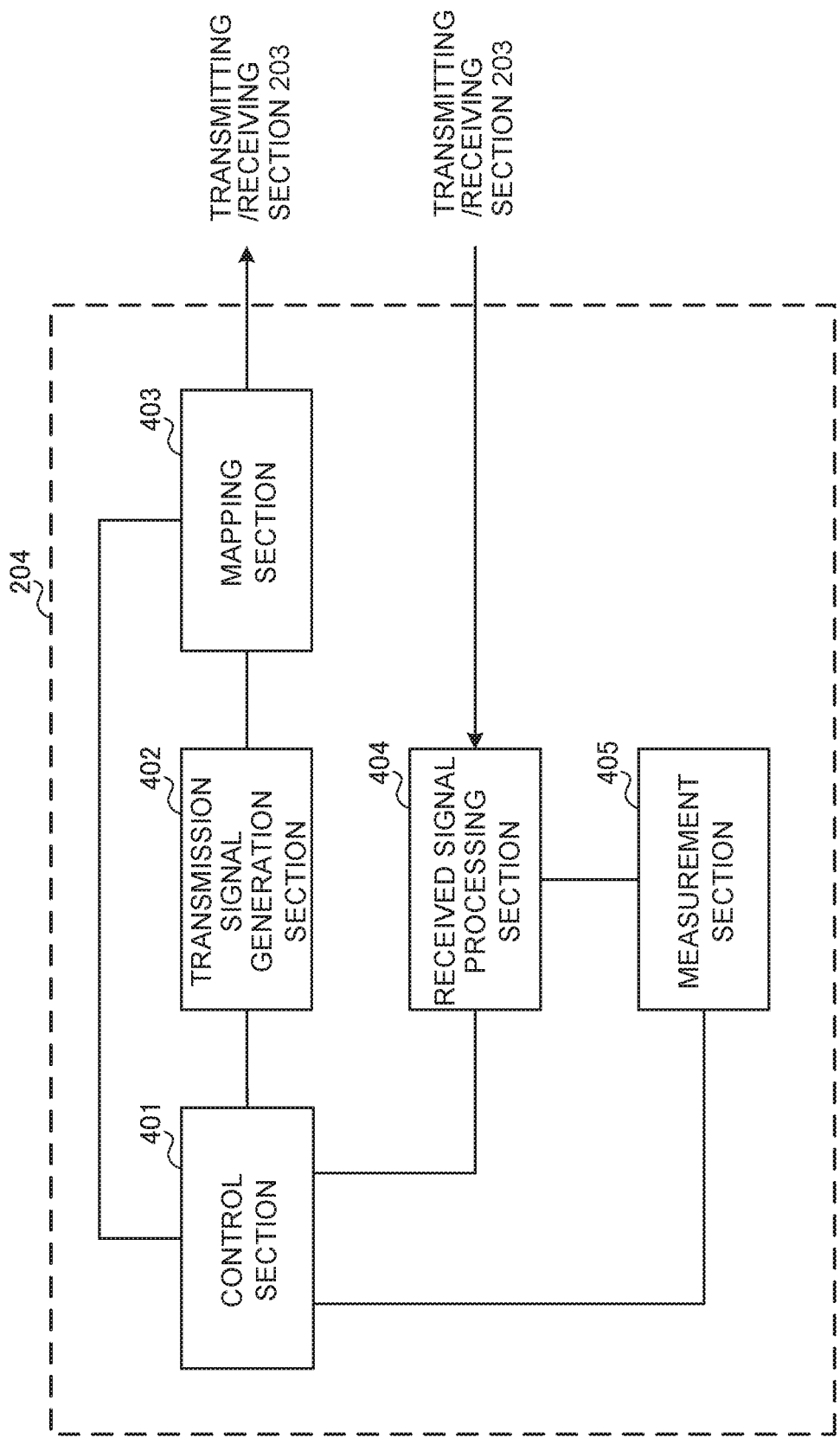
FIG. 21 is a diagram to show an example of a functional structure of a user terminal according to the present embodiment.

FIG. 21 is a diagram to show an example of a functional structure of a user terminal according to the present embodiment. Note that, although FIG. 21 primarily shows functional blocks that pertain to characteristic parts of the present embodiment, the user terminal 20 has other functional blocks that are necessary for radio communication as well. As shown in FIG. 1 the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the UL signal receiving processes in be received signal processing section 404, the measurements in the measurement section 405 and so on.

Furthermore, the control section 401 controls the UL control channel to be used to transmit UCI from the user terminal 20, based on explicit commands from the radio base station 10 or elicit decisions in the user terminal 20.

Furthermore, the control section 401 may control the format of a UL control channel (for example, a long PUCCH and/or a short PUCCH). The control section 401 may control the format of this UL control channel based on control information from the radio base station 10.

Here, a long PUCCH (a UL control channel having a first duration) may be constituted by a plurality of PUCCH units (units), and each of these multiple PUCCH units may be constituted by a short PUCCH (a UL control channel having a second duration) (see the first aspect and FIG. 3). Also, at least two of these multiple PUCCH units may be arranged in different frequency resources (see the first aspect and FIGS. 4, 5, 7, 10 and 11). Also, a long PUCCH may be multiplexed with an SRS (see FIG. 6 to FIG. 11).

Also, in a short PUCCH, the UCI and the DMRS (the demodulation reference signal for the UCI) may be time-division-multiplexed between multiple symbols provided at the same subcarrier spacing as data symbols, or between multiple symbols provided at a higher subcarrier spacing than data symbols (see the first aspect and FIGS. 2A and 2B). Alternatively, short PUCCH, the UCI and the DMRS may be frequency-division-multiplexed (see the first aspect and FIG. 2C).

In addition, the control section 401 may control at least one of the transmission signal generation section 402, the mapping section 403 and the transmitting/receiving sections 203 to transmit the same UCI or different UCIs in at least two of multiple PUCCH units. To be more specific, the control section 401 may apply at least one of spreading, repetition and coding so that the same UCI is transmitted in at least two of a plurality of PUCCH units.

In addition, the control section 401 may control the positions to arrange RSs and/or the density of RSs in slots (or in a long PUCCH) (see the third aspect and FIG. 13 to FIG. 15). To be more specific, the control section 401 may control the arrangement positions and/or the density based on control information from the radio base station 10. Note that the control section 401 may fix the positions for arranging RSs, and control the presence or absence of RSs in these fixed arrangement positions. Alternatively, the control section 401 may control the arrangement of RSs in a flexible manner.

The control section 401 may control at least one of the transmission signal generation section 402, the mapping section 403 and the transmitting/receiving sections 203 to perform UCI transmission processes based on the format of the control channel.

For the control section 401, a controller, a control circuit or control apparatus that can be described based on general understanding of the technical field to which the present invention pertains can be used.

In the transmission signal generation section 402, UL signals (including UL data signals, UL control signals, UL reference signals, UCI, etc.) are generated (including, for example, encoding, rate matching, puncturing, modulation, etc.) based on commands from the control section 401, and output to the mapping section 403. For the transmission signal generation section 402, a signal generator, a signal generation circuit or signal generation apparatus that can be described based on general understanding of the technical field to which the present invention pertains can be used.

The mapping section 403 maps the UL signals generated in the transmission signal generation section 402 to radio resources based on commands from the control section 401, and output the result to the transmitting/receiving sections 203, the mapping section 403, a mapper, a mapping circuit or mapping apparatus that can be described based on general understanding of the technical field to which the present invention pertains can be used.

The received signal processing section 404 performs receiving processes (for example, demapping, demodulation, decoding, etc.) of DL signals (including DL data signals, scheduling information, DL control signals, DL, reference signals, etc.). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section: 405 can be constituted by a signal processor, a signal processing circuit or signal processing apparatus, and a measurer, a measurement circuit or measurement apparatus that can be described based on general understanding of the technical field to which the present invention pertains.

<Hardware Structure>

Note that the block diagrams that have been used to describe the above embodiments show blocks in functional units. These functional blocks (components) may be implemented in arbitrary combinations of hardware/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 22:
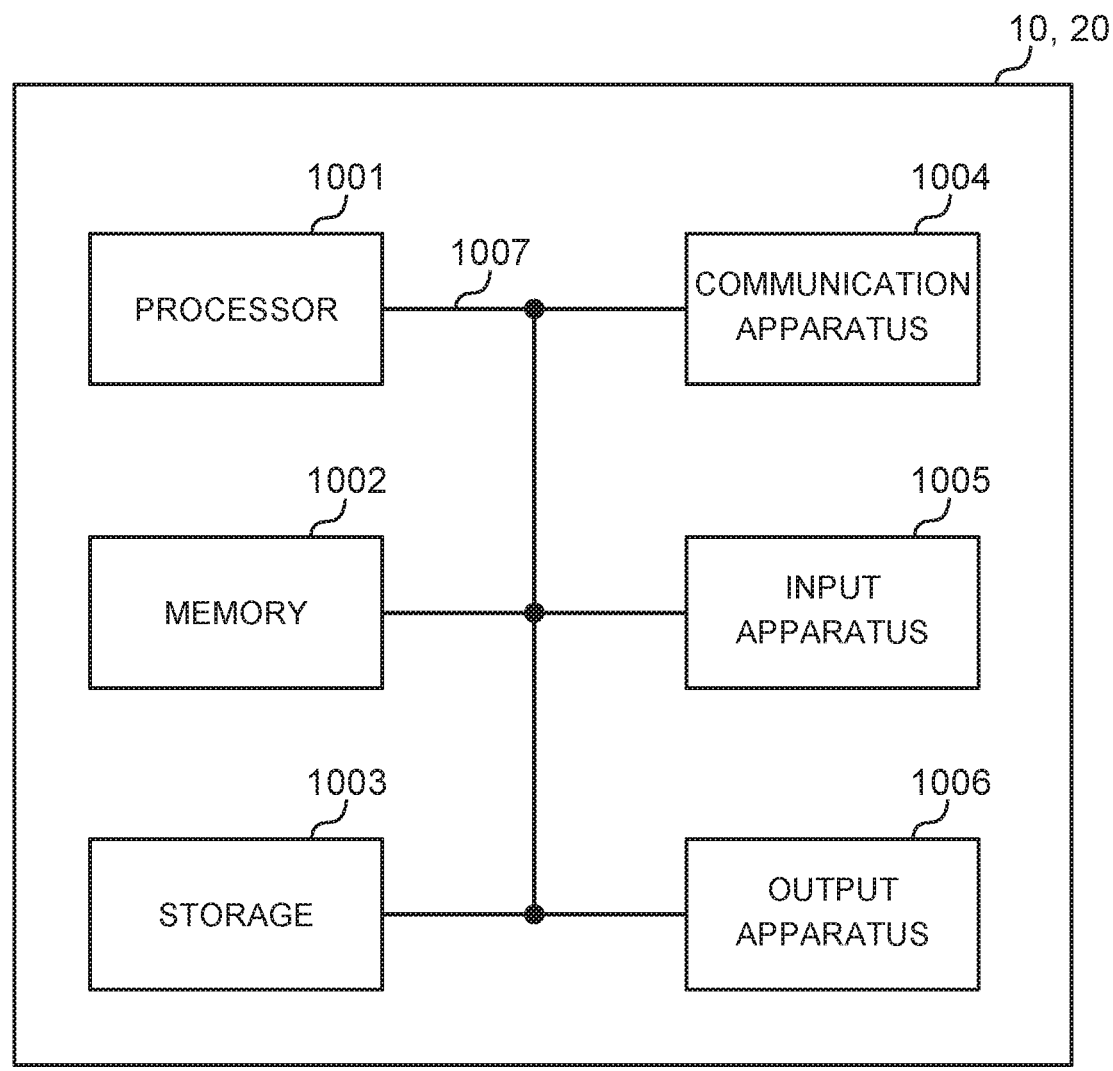
FIG. 22 is a diagram to show an example hardware structure of a radio base station and a user terminal according to the present embodiment.

For example, the radio base station, user terminals and so on according to embodiments of the present invention may function as a computer that executes the processes of the radio communication method of the present invention. FIG. 22 is a diagram to show an example of a hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-describe baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," "cache," "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device,"

"network controller," a "network card," a "communication module" acid so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001 the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Further, a radio frame may be comprised of one or more periods (frames) in the time domain. Each of one or more periods (frames) constituting a radio frame may be referred to as a "subframe." Further, a subframe may be comprised of one or more slots in the time domain. A subframe may be a fixed time duration (for example, one ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of mini-slots. Each mini-slot may consist of one or more symbols in the time domain. Also, a mini-slot may be referred to as a "subslot."

A radio frame, subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (one ms) in existing LIE, may be a shorter period than one ms (for example, one to thirteen symbols), or may be a longer period of time than one ms. Note that the unit to represent the TTI may be referred to as a "slot, slot" and so on, instead of a "subframe."

Here, a TTI refers to the minimum time unit of scheduling in radio communication, for example. For example, in LTE systems a radio base station schedules the radio resources (such as the frequency bandwidth and transmission power that can be used in each user terminal) to allocate to each user terminal in TTI units. Note that the definition of TTIs is not limited, to this.

The TTI may be the transmission time unit of channel-encoded data packets (transport blocks), code blocks and/or codewords, or may be the unit of processing in scheduling, link adaptation and so on. Note that when a TTI is given, the period of time (for example, the number of symbols) in which transport blocks, code blocks and/or code words are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum unit of scheduling may be controlled.

A TTI having a time duration of one ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "mini-slot," "a sub-slot" and so on.

Note that a long TTI (for example, a normal TTI, a subframe, etc.) may be replaced with a TTI having time duration exceeding one ms, and a short TTI (for example, a shortened TTI) may be replaced with a TTI having a TTI length less than the TTI length of a long TTI and not less than one ms.

A resource block (RB) is the unit of resource allocation the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "sub carrier group (SCG: Sub-Carrier Group)," a "resource element group (REG)," a "PRB pair," "RB pair" and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PDCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI) uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication des services within this coverage.

As used herein, the terms "mobile station (NIS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal." "wireless terminal," "remote terminal," "handset," "user agent," "mobile client," "client" or some other suitable terms.

Further, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In his case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMES (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-254383 filed on Dec. 27, 2016, including the specification, drawings and abstract, is incorporated herein by reference in its entirety.

The invention claimed is:

1. A terminal comprising:
a receiver that receives information about uplink control channel using higher layer signaling;
a processor that controls, based on the information, whether a demodulation reference signal is present or absent in a fixed arranging position of the demodulation reference signal for the uplink control channel during a period; and
a transmitter that transmits uplink control information (UCI) using the uplink control channel,
wherein, when intra-slot frequency hopping is applied to the uplink control channel, the transmitter transmits a sounding reference signal (SRS) in a resource block that includes the same subcarriers of a symbol of the uplink control channel in the frequency domain and at a symbol following, and contiguous with, the symbol of the uplink control channel in the time domain.

2. The terminal according to claim 1, wherein the processor controls whether the demodulation reference signal is present or absent in the fixed arranging position based on the information, when frequency hopping is applied to the uplink control channel.

3. The terminal according to claim 2, wherein the transmitter transmits the uplink control information (UCI) in the fixed arranging position, when the demodulation reference signal is absent in the fixed arranging position.

4. The terminal according to claim 1, wherein, when the demodulation reference signal is absent in the fixed arranging position, the transmitter transmits the uplink control information (UCI) in the fixed arranging position.

5. A radio communication method for a terminal, the radio communication method comprising:
receiving information about uplink control channel using higher layer signaling;
controlling, based on the information, whether a demodulation reference signal is present or absent in a fixed arranging position of the demodulation reference signal for the uplink control channel during a period;

transmitting uplink control information (UCI) using the uplink control channel; and transmitting, when intra-slot hopping is applied to the uplink control channel, a sounding reference signal (SRS) in a resource block that includes the same subcarriers of a symbol of the uplink control channel in the frequency domain and at a symbol following, and contiguous with, the symbol of the uplink control channel in the time domain.

6. A base station comprising:

a transmitter that transmits information about uplink control channel using higher layer signaling to control whether a demodulation reference signal is present or absent in a fixed arranging position of the demodulation reference signal for the uplink control channel during a period; and a receiver that receives uplink control information (UCI) transmitted using the uplink control channel, and receives a sounding reference signal (SRS) transmitted in a resource block that includes the same subcarriers of a symbol of the uplink control channel in the frequency domain and at a symbol following, and contiguous with, the symbol of the uplink control channel in the time domain, when intra-slot frequency hopping is applied to the uplink control channel.

7. A system comprising:

a terminal; and a base station, wherein the terminal comprises:

a receiver that receives information about uplink control channel using higher layer signaling;

a processor that controls, based on the information, whether a demodulation reference signal is present or absent in a fixed arranging position of the demodulation reference signal for the uplink control channel during a period; and a transmitter that transmits uplink control information (UCI) using the uplink control channel, wherein, when intra-slot frequency hopping is applied to the uplink control channel, the transmitter transmits a sounding reference signal (SRS) in a resource block that includes the same subcarriers of a symbol of the uplink control channel in the frequency domain and at a symbol following, and contiguous with, the symbol of the uplink control channel in the time domain; and the base station comprises:

a transmitter that transmits the information; and a receiver that receives the UCI and the SRS.

\* \* \* \* \*